(12) United States Patent
Tonami et al.

(10) Patent No.: US 11,858,284 B2
(45) Date of Patent: Jan. 2, 2024

(54) INFORMATION PROCESSING APPARATUS, PRINTING SYSTEM, IMAGE PROCESSING METHOD, AND RECORDING MEDIUM

(71) Applicants: Kazunari Tonami, Kanagawa (JP); Yu Yoneda, Kanagawa (JP)

(72) Inventors: Kazunari Tonami, Kanagawa (JP); Yu Yoneda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 136 days.

(21) Appl. No.: 17/404,261

(22) Filed: Aug. 17, 2021

(65) Prior Publication Data

US 2022/0063315 A1  Mar. 3, 2022

(30) Foreign Application Priority Data

Aug. 31, 2020  (JP) .................................. 2020-146082

(51) Int. Cl.
| | |
|---|---|
| *H04N 1/23* | (2006.01) |
| *G06K 15/02* | (2006.01) |
| *G06F 3/12* | (2006.01) |
| *B41M 3/00* | (2006.01) |
| *B41M 3/06* | (2006.01) |
| *H04N 13/122* | (2018.01) |

(Continued)

(52) U.S. Cl.
CPC .............. *B41M 3/008* (2013.01); *B41M 3/00* (2013.01); *B41M 3/06* (2013.01); *G06K 15/1809* (2013.01); *H04N 1/2369* (2013.01); *B44F 7/00* (2013.01); *H04N 13/122* (2018.05); *H04N 13/351* (2018.05)

(58) Field of Classification Search
None
See application file for complete search history.

(56) References Cited

U.S. PATENT DOCUMENTS 8,301,062 B2 * 10/2012 Stelter ................ G03G 15/6585
399/223
2010/0026711 A1 * 2/2010 Muramoto ............... G09G 5/02
345/619

(Continued)

FOREIGN PATENT DOCUMENTS

| | | | |
|---|---|---|---|
| GB | 2373481 | * 9/2002 | ................ B41J 3/60 |
| JP | 2000-180996 | 6/2000 | |

(Continued)

OTHER PUBLICATIONS

Extended European Search Report dated Feb. 7, 2022, issued in corresponding European Patent Application No. 21193061.5.

*Primary Examiner* — Beniyam Menberu
(74) *Attorney, Agent, or Firm* — Harness, Dickey & Pierce, P.L.C.

(57) ABSTRACT

An apparatus, system, method, and a control program stored in a non-transitory recording medium, each of which: receives a plurality of input images corresponding to respective viewpoints; generates, based on the plurality of input images, a first output image and a second output image that are to be printed by duplex printing on at least one transmissive transfer medium having image layers on both sides thereof, so as to reproduce at least part of one of the input images corresponding to each of the viewpoints on the transmissive transfer medium; and instructs a printer to print the first output image and the second output image by duplex printing.

19 Claims, 14 Drawing Sheets

(51) Int. Cl.
*H04N 13/351* (2018.01)
*B44F 7/00* (2006.01)

(56) References Cited

U.S. PATENT DOCUMENTS

| | | |
|---|---|---|
| 2012/0308072 A1 | 12/2012 | Lefèbvre et al. |
| 2013/0057608 A1 | 3/2013 | Yamamoto et al. |
| 2017/0085867 A1 | 3/2017 | Baran et al. |

FOREIGN PATENT DOCUMENTS

| | | | | | |
|---|---|---|---|---|---|
| JP | 2002372904 | * | 12/2002 | ............... | G06T 3/00 |
| JP | 2006-330426 | | 12/2006 | | |
| JP | 2007187768 | * | 7/2007 | ............... | G09F 7/16 |
| JP | 2011112681 | * | 6/2011 | ............... | H04N 1/00 |
| JP | 2018-537046 | | 12/2018 | | |
| WO | WO-2006/087583 A1 | | 8/2006 | | |
| WO | WO2017/049106 A1 | | 3/2017 | | |

* cited by examiner

FIG. 8

| | LONG-SIDE BINDING | SHORT-SIDE BINDING |
|---|---|---|
| DIRECTION OF DOCUMENT, VERTICAL | LEFT-RIGHT INVERSION → LEFTWARD OPENING | UP-DOWN INVERSION → UPWARD OPENING |
| DIRECTION OF DOCUMENT, LATERAL | UP-DOWN INVERSION → UPWARD OPENING | LEFT-RIGHT INVERSION → LEFTWARD OPENING |

(AMOUNT OF POSITIONAL DEVIATION = 0)

(AMOUNT OF POSITIONAL DEVIATION = $\Delta x$)

INFORMATION PROCESSING APPARATUS, PRINTING SYSTEM, IMAGE PROCESSING METHOD, AND RECORDING MEDIUM

CROSS-REFERENCE TO RELATED APPLICATIONS

This patent application is based on and claims priority pursuant to 35 U.S.C. § 119(a) to Japanese Patent Application No. 2020-146082, filed on Aug. 31, 2020, in the Japan Patent Office, the entire disclosure of which is hereby incorporated by reference herein.

BACKGROUND

Technical Field

The present disclosure relates to an information processing apparatus, a printing system, an image processing method, and a non-transitory recording medium.

Description of the Related Art

A technique called light field printing is known as a technique for implementing a print in which an observed image changes depending on a viewpoint. For example, there is a technique of producing a light field print including at least two different transparent layers including a transparent front layer and a transparent back layer. This technique applies a print material on the transparent front layer in accordance with a first target pattern, applies a print material on the transparent back layer in accordance with a second target pattern, and arranges the transparent front layer at a certain distance in the depth direction from the transparent back layer.

Further, there is a technique of stereoscopic printing, in which a certain back-side print image is applied to a back-side print surface of a transparent member having a certain thickness and a certain refractive index, and a front-side print image having visual displacement with respect to the back-side print image is applied to a front-side print surface of the transparent member.

SUMMARY

Example embodiments include an information processing apparatus including circuitry to: receive a plurality of input images corresponding to respective viewpoints; generate, based on the plurality of input images, a first output image and a second output image that are to be printed by duplex printing on at least one transmissive transfer medium having image layers on both sides thereof, so as to reproduce at least part of one of the input images corresponding to each of the viewpoints on the transmissive transfer medium; and instruct a printer to print the first output image and the second output image by duplex printing.

Example embodiments include a printing system including the information processing apparatus, and a printer to perform the duplex printing of the first output image and the second output image on a transmissive transfer medium.

Example embodiments include an image processing method including: receiving a plurality of input images corresponding to respective viewpoints; generating, based on the plurality of input images, a first output image and a second output image that are to be printed by duplex printing on at least one transmissive transfer medium having image layers on both sides thereof, so as to reproduce at least part of one of the input images corresponding to each of the viewpoints on the transmissive transfer medium; and instructing a printer to print the first output image and the second output image by duplex printing.

Example embodiments include a non-transitory recording medium storing a control program for causing one or more processors to perform the image processing method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 8 is a table presenting inversion processes corresponding to print settings by the information processing apparatus according to the embodiment;

Figure 1:
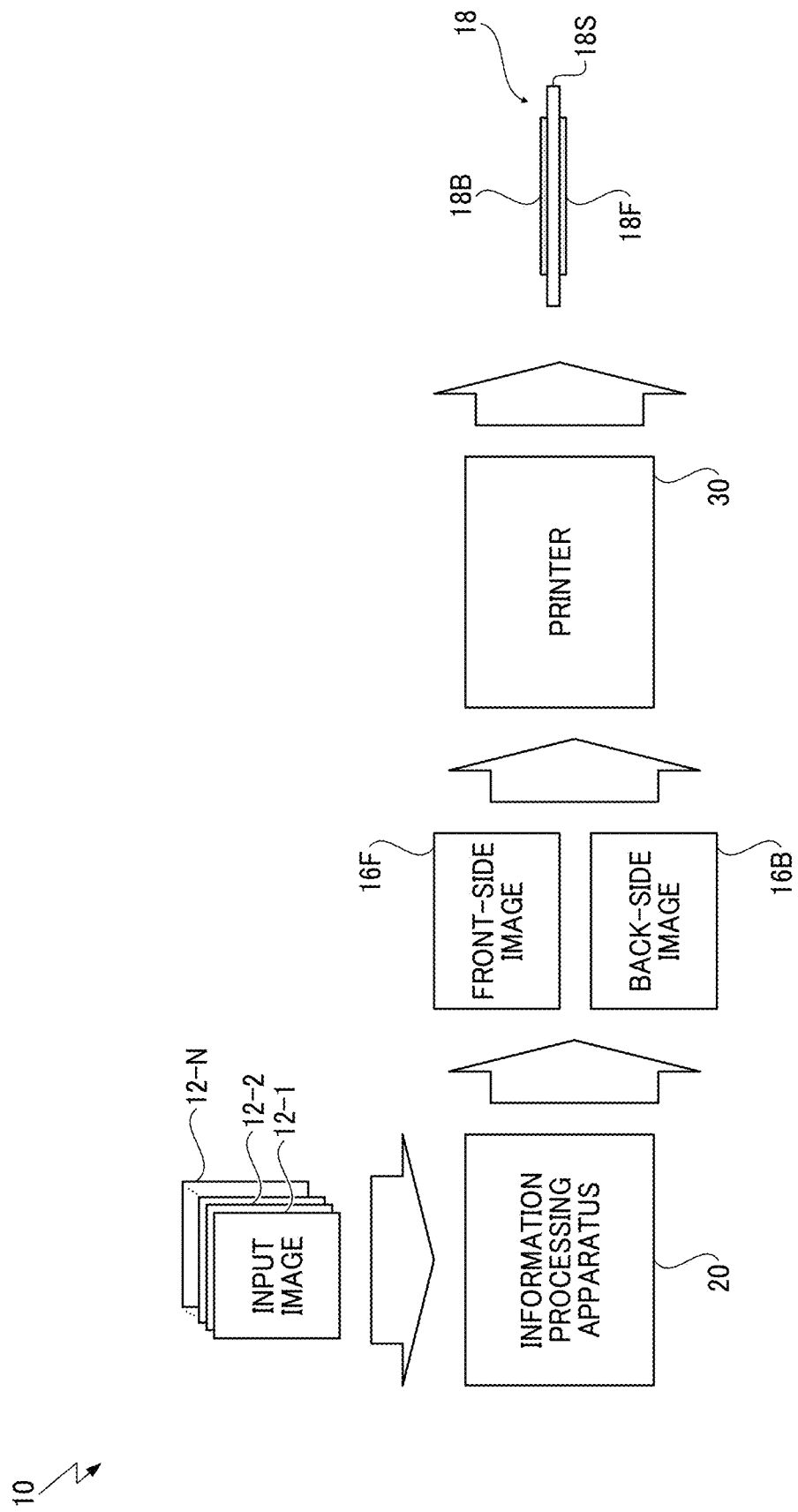
FIG. 1 is a diagram of a general arrangement of a printing system including an information processing apparatus and a printer according to an embodiment.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

While embodiments of the present disclosure will be described below, embodiments of the present disclosure are not limited to the embodiments described below. In an embodiment described below, an information processing apparatus 20 connected to a printer 30, and a printing system 10 including the information processing apparatus 20 and the printer 30 will be described as examples of an information processing apparatus and a printing system. However, the information processing apparatus and the printing system are not limited to the specific embodiments described below.

FIG. 1 illustrates a general arrangement of the printing system 10 according to the embodiment. The printing system 10 illustrated in FIG. 1 includes the information processing apparatus 20 and the printer 30. The information processing apparatus 20 and the printer 30 are connected via an appropriate interface such as a dedicated line, a Universal Serial Bus (USB), or a wired or wireless local area network (LAN).

The information processing apparatus 20, for example, receives an input of an input image set 12 for light field printing from a terminal connected via a LAN or the like, and generates an image to be printed on a transmissive transfer medium such as a transparent sheet in accordance with a predetermined algorithm. The information processing apparatus 20 also issues a print command (print instruction) to the printer 30 based on the generated image.

Respective input images constituting the input image set 12 are referred to as input images 12-1 to 12-N. The input images 12-1 to 12-N are image data corresponding to respective predetermined observation viewpoints. The user prepares the input image set 12 to obtain a desired light field print.

In the embodiment, a generated image includes at least two images to be duplex printed on a transmissive transfer medium such as a transparent sheet. Hereinafter, an image to be printed on the front side is referred to as a front-side image 16F, and an image to be printed on the back side is referred to as a back-side image 16B. The front-side image 16F and the back-side image 16B are generated by solving a predetermined optimization problem. The front-side image 16F and the back-side image 16B are images with specific patterns obtained by solving the optimization problem. The front-side image 16F does not have a meaning as an image, and the back-side image 16B does not have a meaning as an image. A meaningful image is reproduced by superimposing the front-side image 16F and the back-side image 16B. This is a feature of light field printing.

In response to a print command (print instruction) from the information processing apparatus 20, the printer 30 forms images on both sides of a transmissive transfer medium 18S based on print image data including the front-side image 16F and the back-side image 16B, and outputs a print 18. The print 18 includes the transmissive transfer medium 18S, an image layer 18F on the front side, and an image layer 18B on the back side. The image layer 18F and the image layer 18B are arranged substantially in parallel and apart from each other. The print 18 is a light field print having an image to be observed that changes by changing an observation viewpoint. Hereinafter, the print 18 may be referred to as a light field print 18.

When a plurality of input images represent images of a predetermined subject observed from a plurality of viewpoints, it is possible to provide a print that stereoscopically expresses the subject. However, the light field print 18 according to the embodiment is not limited to one providing stereoscopic vision. For example, a plurality of input images may express different subjects. In this case, changing the viewpoint will change the subject being observed.

Before describing the light field printing function provided by the printing system 10 according to the embodiment, hardware configurations of the information processing apparatus 20 and the printer 30 constituting the printing system 10 will be described below.

Figure 2:
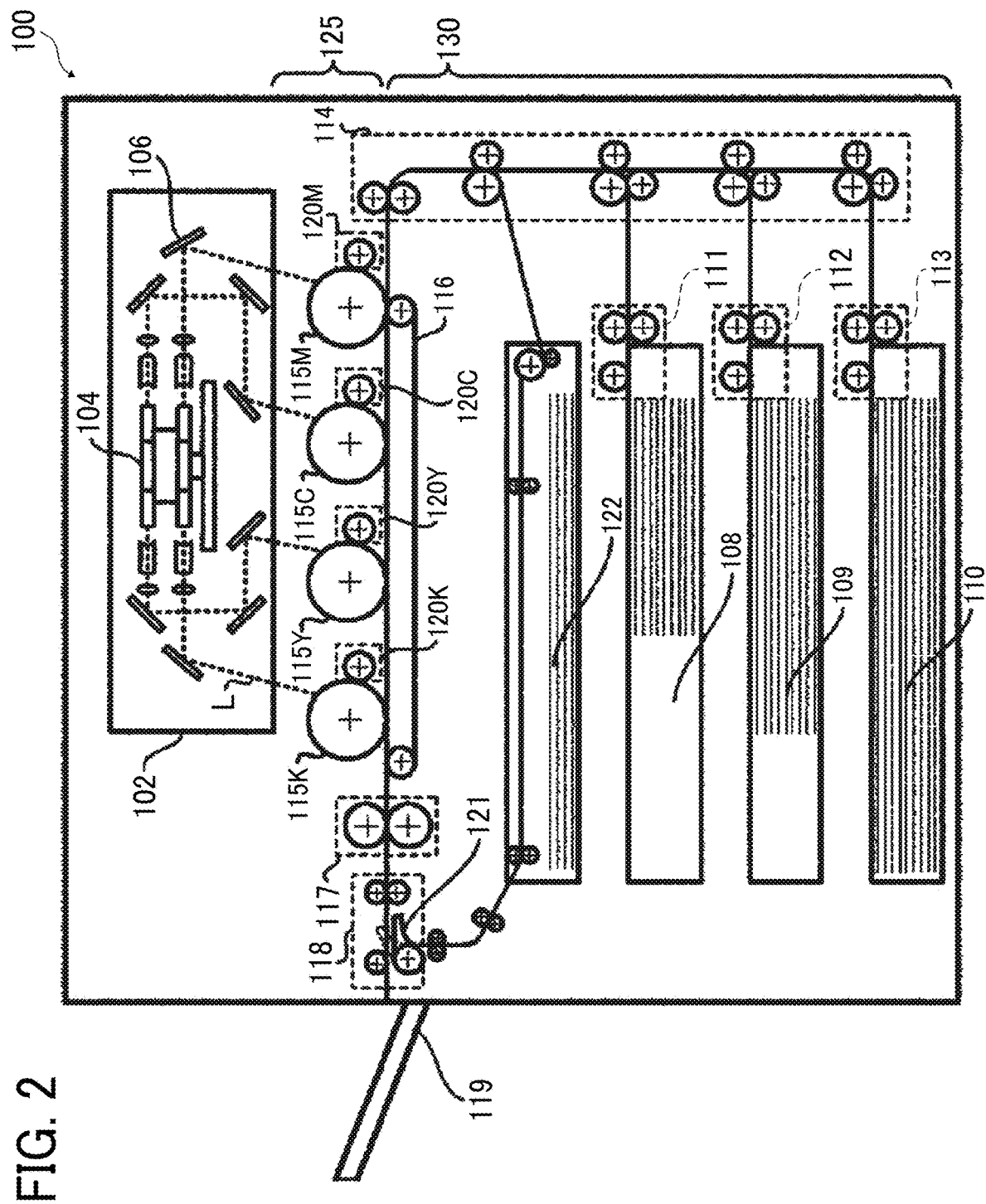
FIG. 2 is a diagram illustrating a configuration of the printer according to the embodiment.

FIG. 2 illustrates an embodiment of a printer 100 (corresponding to the printer 30 illustrated in FIG. 1). The printer 100 illustrated in FIG. 2 includes an optical device 102, an imaging unit 125, and a transfer and fixing unit 130. The optical device 102 includes optical elements such as a semiconductor laser element and a polygon mirror 104. The imaging unit 125 includes, for example, photoconductive drums 115K, 115Y, 115C, and 115M, charging devices, and developing devices. The transfer and fixing unit 130 includes, for example, a fixing unit 117, a conveyor belt 116, and an intermediate transfer belt.

The optical device 102 includes a laser output unit. A light beam L emitted from the laser output unit is focused by a cylindrical lens and deflected by the polygon mirror 104 toward a reflecting mirror 106. The light beam L includes light beams L corresponding to respective colors of cyan (C), magenta (M), yellow (Y), and black (K) in the illustrated embodiment. The light beams L are directed to the respective photoconductive drums 115K, 115Y, 115C, and 115M (hereinafter collectively referred to as photoconductive drums 115) via corresponding imaging forming lenses to form electrostatic latent images thereon.

The diameter of the exposure spot of the light beam L emitted onto the photoconductive drum 115 is defined in the main-scanning direction and the sub-scanning direction using the spatial size of a predetermined range. The main-scanning direction is defined as a scanning direction of the light beam, and the sub-scanning direction is defined as a direction orthogonal to the main-scanning direction. In the embodiment, the sub-scanning direction corresponds to a conveyance direction of a transfer medium, and the main-scanning direction corresponds to a non-conveyance direction in which the transfer medium is not conveyed. However, the directions are not limited to the above-described definitions and may be determined depending on the specific implementations of the printer 100.

The electrostatic latent images thus formed are conveyed to the development devices 120K, 120Y, 120C, and 120M (hereinafter referred to as development devices 120) as the photoconductive drums 115 rotate, respectively. The development devices 120 develop the electrostatic latent images with developers of the respective colors to form visible toner images on the photoconductive drums 115. The photoconductive drums 115 rotate while carrying the toner images, and thus convey the toner images to the transfer and fixing unit 130. The transfer and fixing unit 130 includes feed trays 108, 109, and 110, feed units 111, 112, and 113, a vertical conveyance unit 114, the conveyor belt 116, and the fixing unit 117. Each of the feed trays 108 through 110 accommodates transfer media such as plastic sheets. The feed units 111 through 113 feed the transfer media from the respective feed trays 108 through 110 one by one to the vertical conveyance unit 114. The vertical conveyance unit 114 conveys a transfer medium fed by one of the feed units 111 through 113 to a position where the transfer medium contacts the closest photoconductive drum 115.

The transfer medium thus conveyed is then electrostatically attached to the conveyor belt 116. The toner images are transferred onto the transfer medium from the respective photoconductive drums 115 at a transfer bias potential to form a color toner image thereon. The transfer medium carrying the color toner image is then conveyed to the fixing unit 117 after transferring. The fixing unit 117 includes, for example, a fixing member such as a fixing roller including silicon rubber or fluororubber. In the fixing unit 117, the color toner image is fixed onto the transfer medium under heat and pressure to form a color image thereon.

A print after fixing is then conveyed to a discharge unit 118 that discharges the print onto a discharge tray 119. The discharge unit 118 includes a separation claw 121 to direct the print to a duplex feed unit 122. Upon duplex printing, the discharge unit 118 does not discharge the print onto the discharge tray 119, but directs the print to the duplex feed unit 122 with the separation claw 121 set at an upper position. The print conveyed to the duplex feed unit 122 is fed to the vertical conveyance unit 114 to consequently carry another image on the back side. After passing through the fixing operation, the print carrying images on both sides reaches the discharge unit 118 that discharges the print onto the discharge tray 119 with the separation claw 121 set at a lower position.

Figure 3:
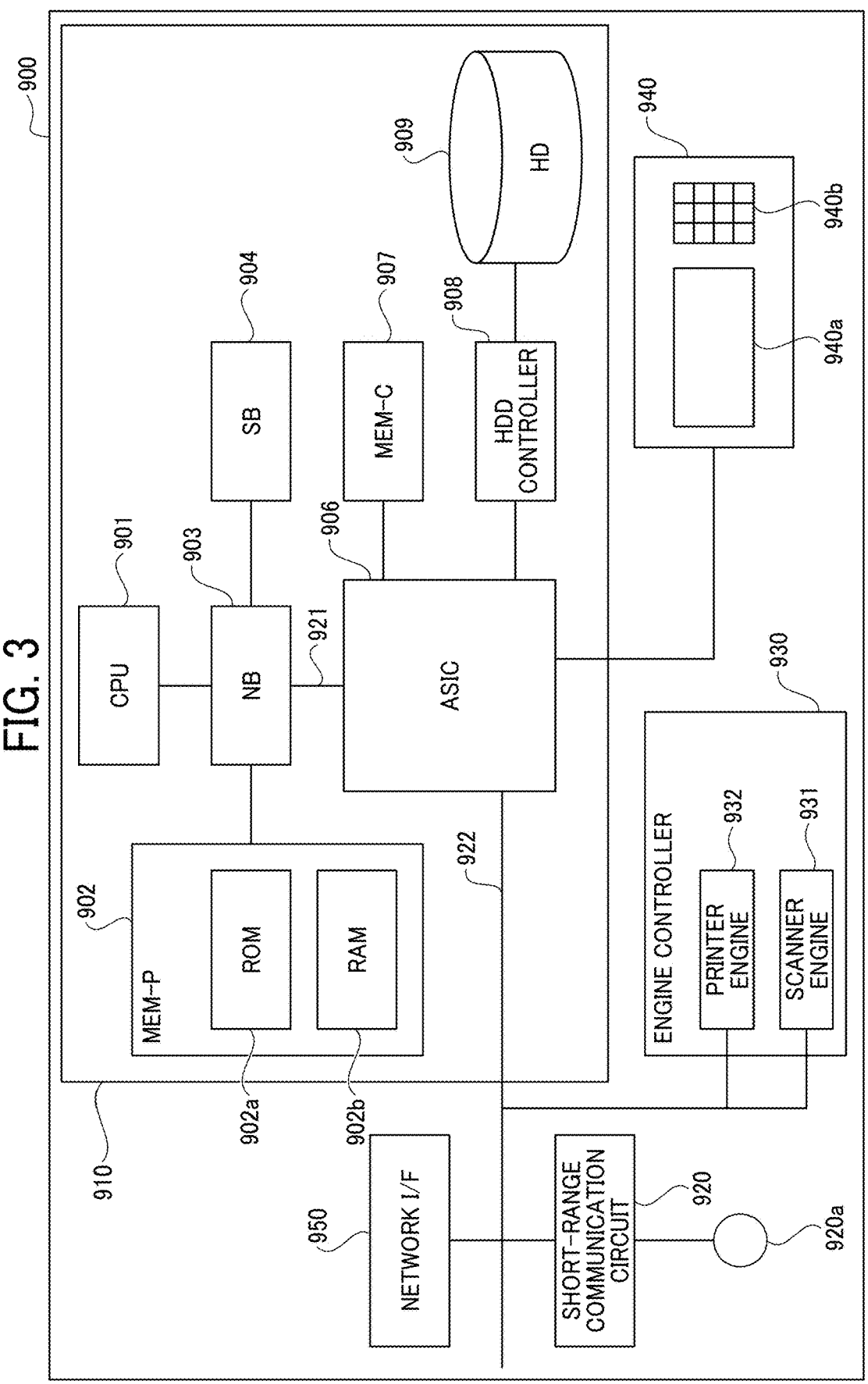
FIG. 3 is a diagram illustrating a hardware configuration of the printer according to the embodiment.

FIG. 3 is a diagram illustrating a hardware configuration of the printer according to the embodiment. As illustrated in FIG. 3, a printer 900 (corresponding to the printer 30 illustrated in FIG. 1) includes a controller 910, a short-range communication circuit 920, an engine controller 930, a control panel 940, and a network interface (I/F) 950.

The controller 910 includes a central processing unit (CPU) 901 as a main processor of a computer, a system memory (MEM-P) 902, a north bridge (NB) 903, a south bridge (SB) 904, an Application Specific Integrated Circuit (ASIC) 906, a local memory (MEM-C) 907 as a storage unit, a hard disk drive (HDD) controller 908, and a hard disk (HD) 909 as a storage unit. The NB 903 and the ASIC 906 are connected through an Accelerated Graphics Port (AGP) bus 921.

The CPU 901 controls the entire operation of the printer 900. The NB 903 couples the CPU 901, with the MEM-P 902, the SB 904, and the AGP bus 921. The NB 903 includes a memory controller for controlling reading or writing of various data from or to the MEM-P 902, a Peripheral Component Interconnect (PCI) master, and an AGP target.

The MEM-P 902 includes a read-only memory (ROM) 902a as a memory that stores a program and data for implementing various functions of the controller 910. The MEM-P 902 further includes a random access memory (RAM) 902b as a memory that deploys the program and data, or as a drawing memory that stores drawing data for printing. The program stored in the RAM 902b can be stored in any computer-readable recording medium, such as a compact disc-read only memory (CD-ROM), a compact disc-recordable (CD-R), or a digital versatile disc (DVD), in a file format installable or executable by the computer, for distribution.

The SB 904 couples the NB 903 with a PCI device and a peripheral device. The ASIC 906 is an integrated circuit (IC) having a hardware element for image processing and dedicated to an image processing use, and couples the AGP bus 921, a PCI bus 922, the HDD controller 908, and the MEM-C 907 to each other. The ASIC 906 includes a PCI target, an AGP master, an arbiter (ARB) as a central processor of the ASIC 906, a memory controller, a plurality of direct memory access controllers (DMACs), and a PCI unit. The memory controller controls the MEM-C 907. The DMACs is capable of rotating image data with a hardware logic. The PCI unit transfers data between a scanner engine 931 and a printer engine 932 through the PCI bus 922. A USB interface or an Institute of Electrical and Electronics Engineers 1394 (IEEE 1394) interface may be connected to the ASIC 906.

The MEM-C 907 is a local memory used as a buffer for image data to be copied or coding. The HD 909 is a storage for storing image data, font data used for printing, and forms. The HD 909 reads or writes various data from or to the HD 909 under control of the CPU 901. The AGP bus 921 is a bus interface for a graphics accelerator card proposed for speeding up graphic processing, and can speed up the graphics accelerator card by directly making an access to the MEM-P 902 with high throughput.

The short-range communication circuit 920 is provided with an antenna 920a. The short-range communication circuit 920 is a communication circuit of Near Field Communication (NFC), Bluetooth (registered trademark), or the like.

The engine controller 930 includes the scanner engine 931 and the printer engine 932. The control panel 940 includes a panel display 940a and an operation panel 940b. The panel display 940a is implemented by, for example, a touch panel that displays current settings or a selection screen to receive a user input. The operation panel 940b includes a numeric keypad that receives set values of various image forming parameters such as an image density parameter and a start key that receives a command for starting copying. The controller 910 controls overall operation of the printer 900. For example, the controller 910 controls drawing, communication, or user inputs to the control panel 940. The scanner engine 931 and the printer engine 932 each performs various image processing, such as error diffusion or gamma conversion.

In response to an instruction to select a specific application through the control panel 940, for example, using a mode switch key, the printer 900 selectively performs a document box function, a copier function, a printer function, and a facsimile function. When the document box function is selected, a document box mode is set, when the copier function is selected, a copier mode is set, when the print function is selected, a printer mode is set, and when the facsimile function is selected, a facsimile mode is set.

The network I/F 950 controls data communication with an external device through a network. The short-range communication circuit 920 and the network I/F 950 are electrically connected to the ASIC 906 through the PCI bus 922.

Figure 4:
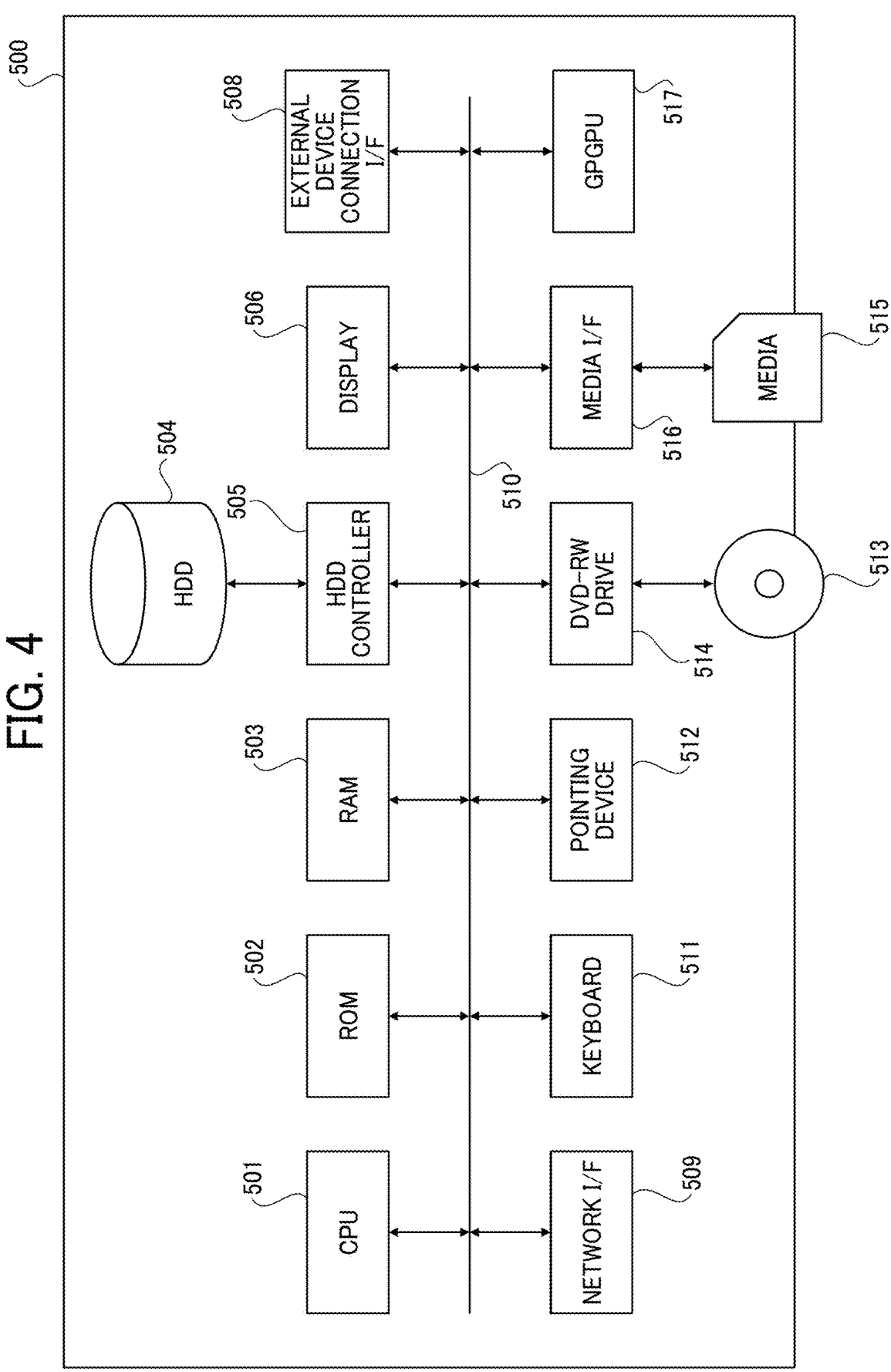
FIG. 4 is a diagram illustrating a hardware configuration of a computer that can be used as the information processing apparatus in the embodiment.

FIG. 4 is a diagram illustrating a hardware configuration of a computer that can be used as the information processing apparatus 20 in the embodiment. In the embodiment, a description is given of a hardware configuration of a personal computer 500.

The personal computer 500 in FIG. 4 is constructed by a general-purpose computer. As illustrated in FIG. 4, the computer 500 includes a CPU 501, a ROM 502, a RAM 503, a HD 504, a HDD controller 505, a display 506, an external device connection I/F 508, a network I/F 509, a data bus 510, a keyboard 511, a pointing device 512, a DVD rewritable (DVD-RW) drive 514, a medium I/F 516, a General-Purpose computing on Graphics Processing Units (GPGPU) 517.

The CPU 501 controls entire operation of the personal computer 500. The ROM 502 stores a control program such as an initial program loader (IPL) to boot the CPU 501. The RAM 503 is used as a work area for the CPU 501. The HD 504 stores various data such as a program. The HDD controller 505 controls reading or writing of various data from or to the HD 504 under control of the CPU 501. The display 506 displays various information such as a cursor, a menu, a window, characters, or an image. The external device connection I/F 508 is an interface that couples the personal computer 500 to various external devices. Examples of the external devices include, but not limited to, a USB memory and a printer. The network I/OF 509 is an interface that controls communication of data through the communication network. The data bus 510 is, for example, an address bus or a data bus that electrically couples the elements such as the CPU 501 illustrated in FIG. 4.

The keyboard 511 is an example of an input device provided with a plurality of keys for allowing a user to input characters, numerals, or various instructions. The pointing device 512 is an example of an input device that allows a user to select or execute a specific instruction, select a target for processing, or move a cursor being displayed. The DVD-RW drive 514 controls reading or writing of various data from or to a DVD-RW medium 513 as one example of a removable recording medium. The removable recording medium is not limited to the DVD-RW and may be a DVD recordable (DVD-R) or the like. The medium I/F 516 controls reading or writing (storing) of data from or to a recording medium 515 such as a flash memory. The GPGPU 517 is an arithmetic device capable of handling image processing or processing having a large load other than the image processing, at high speed.

The hardware configurations of the printer 30 and the information processing apparatus 20 have been described above referring to FIGS. 2 to 4. However, the hardware configurations of the information processing apparatus 20 and the printer 30 are not limited thereto. In the case of a printer or a computer of another type, it is possible to constitute the printer or the computer in a way similar to that illustrated in FIGS. 2 to 4 by appropriately adding or deleting a hardware component, or adding and deleting a hardware component.

Hereinafter, the light field printing function according to the embodiment will be described in more detail with reference to FIG. 5.

Figure 5:
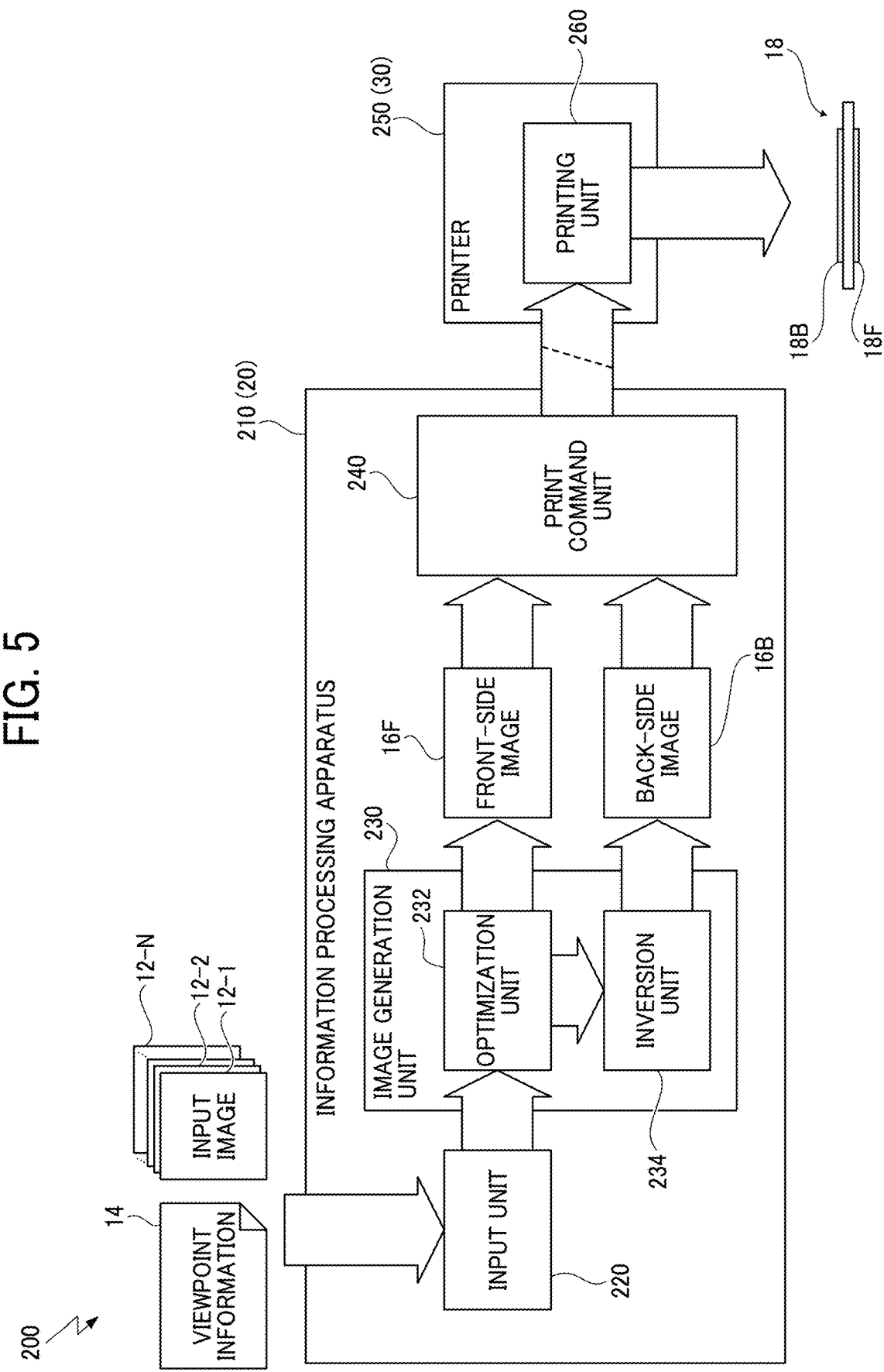
FIG. 5 is a diagram illustrating functional blocks provided on the information processing apparatus and the printer for implementing a light field printing function according to the embodiment.

FIG. 5 is a diagram illustrating a functional block 200 of the printing system 10 for implementing the light field printing function according to the embodiment. FIG. 5 illustrates a functional block 210 on the information processing apparatus 20 and a functional block 250 on the printer 30.

As illustrated in FIG. 5, in the embodiment described here, the functional block 210 of the information processing apparatus 20 includes an input unit 220, an image generation unit 230, and a print command unit 240.

The input unit 220 receives an input image set 12 including a plurality of input images 12-1 to 12-N corresponding to respective viewpoints. The input image set 12 desirably includes three or more input images 12-1 to 12-N (N≥3) corresponding to three or more viewpoints. A predetermined viewpoint (1, . . . x, . . . , N) is set for each of the input images 12-1 to 12-N, and viewpoint information 14 describing a correspondence relationship between each viewpoint and a corresponding one of the input images 12-1 to 12-N may also be provided to the input unit 220. The viewpoint information 14 may be provided separately from data of each of the input images 12-1 to 12-N, or may be embedded in a file name according to a predetermined rule (such as a serial number) and provided together with each of the input images 12-1 to 12-N. In the latter case, the input unit 220 can interpret the correspondence relationship with the viewpoint from the file name.

The input image set 12 defines an image desirable when observed from each of a plurality of viewpoints, and is prepared by the user so as to obtain a desirable light field print. The input image set 12 and the viewpoint information 14 input to the input unit 220 are passed to the image generation unit 230. In order to improve the quality of the reproduced image, in addition to the input image set 12 and the viewpoint information 14, information such as the thickness, transmissivity, and refractive index of the transmissive transfer medium, and characteristics such as the transmissivity and dot gain of the toner of the printer may be provided.

The image generation unit 230 generates a pair of output images to be duplex printed on the transmissive transfer medium by an optimization process based on the input image set 12 and the viewpoint information 14. More particularly, the pair of output images to be duplex printed is the front-side image 16F and the back-side image 16B. When image layers are formed on both sides of transmissive transfer media, the optimization process is performed to reproduce, at each of respective viewpoints at a time of observation, at least part of a corresponding one of input images, in at least one transmissive transfer medium having image layers on the front side and the back side thereof.

Normally, a plurality of input images, desirably three or more input images, are compressed into two images on the front side and the back side, and the amount of information decreases. Therefore, in the optimization process, the input images are approximately reproduced. In the embodiment described here, input images are reproduced by one transmissive transfer medium having image layers formed on both sides thereof. However, the disclosure is not limited thereto. An embodiment is also included in which a plurality of input images are reproduced by bonding a plurality of transfer media including at least one transmissive transfer medium having image layers formed on both sides thereof.

For example, four images, that is, a front-side image and a back-side image for a first transfer medium and a front-side image and a back-side image for a second transfer medium may be generated from a plurality of input images by the optimization process, the four images may be duplex printed on the two transfer media, and the two transfer media may be bonded to each other. Accordingly, the image quality is expected to be improved as compared with the case where the image is reproduced on one transmissive transfer medium. When a plurality of transfer media are bonded together, it is not required that all the transfer media be duplex printed transmissive transfer media.

That is, at least one transmissive transfer medium may be one transmissive transfer medium subjected to duplex printing, or may be a laminate of a plurality of transfer media including at least one transmissive transfer medium subjected to duplex printing. The expression "to reproduce, at each of respective viewpoints at a time of observation, at least part of a corresponding one of input images, in at least one transmissive transfer medium" may include approximate reproduction of input images by one duplex-printed transmissive transfer medium, approximate reproduction of input images by a plurality of duplex-printed transmissive transfer media, and approximate reproduction of input images by a plurality of transfer media including at least one duplex-printed transmissive transfer medium and a simplex-printed transfer medium.

In the embodiment described here, more particularly, the image generation unit 230 includes an optimization unit 232 and an inversion unit 234.

The optimization unit 232 executes an optimization process based on the input image set 12 and the viewpoint information 14. The optimization process optimizes a pair of output images based on the input image set 12 to minimize a difference between each of reproduced images reproduced at respective viewpoints using a plurality of image layers, in which a pair of temporary output images during trial are arranged apart from each other, and a corresponding one of the input images for the viewpoint. In this stage, the optimization calculation does not include that the plurality of image layers arranged apart from each other are duplex printed on both sides of the transfer medium, and an error between the image reproduced using the plurality of image layers arranged apart from each other (an image reproduced at each viewpoint is referred to as a reproduction image) and the input image is minimized. The error between the reproduced image and the input image is the total sum of differences over a plurality of viewpoints, and this is an objective function. The optimization process can be performed using an existing technique such as gradient descent.

The inversion unit 234 performs image inversion on one of the pair of output images generated by the optimization process in accordance with an opening direction of duplex printing to obtain a final front-side image 16F and a final back-side image 16B. Typically, the output image corresponding to the back-side image is inverted. By inverting the image, the front-side image 16F and the back-side image 16B that minimize the total sum of errors between the reproduced image and the input image in the case of duplex printing on the transmissive transfer medium are obtained.

The print command unit 240 outputs print image data and issues a print command (print instruction) to the printer 30 based on the generated front-side image 16F and back-side image 16B. The print command is added with the designation of the feed tray that accommodates transmissive transfer media, and the setting of duplex printing of the front-side image 16F and the back-side image 16B. The print command may be also added with settings such as a document direction, and an opening direction and a binding direction of duplex printing.

The functional block 250 of the printer 30 includes a printing unit 260. The printer 30 has a duplex printing function of forming images on both sides of a transfer medium. The printer 30 also includes a feed tray that accommodates transmissive transfer media. The printing unit 260 feeds a transfer medium from a designated feed tray based on a print command for duplex printing from the information processing apparatus 20, and prints a front-side image 16F and a back-side image 16B on the front side and the back side of the transfer medium, respectively. As described above, when the feed tray that accommodates the transmissive transfer media is designated, image layers 18F and 18B corresponding to the front-side image 16F and the back-side image 16B are formed on the front side and the back side of the transmissive transfer medium 18S, respectively.

In the embodiment described here, an inverted image is obtained by performing an inversion process on one of a pair of output images, and a print command is issued using the inverted image. However, the method of obtaining one inverted image is not limited thereto. For example, when image inversion is performed as a function of the printer driver or the printer 30, instead of performing the inversion process on one of the output images to issue a print command, a print setting indicating that image inversion is to be performed may be added and a print command may be issued without performing image inversion on the output image.

Also, in the embodiment described here, the optimization calculation by the optimization unit 232 does not include printing of the plurality of spaced apart image layers on both sides of the transfer medium. However, in another embodiment, the image generation unit 230 may directly optimize the front-side image 16F and the back-side image 16B based on a plurality of input images under a condition that a plurality of image layers are duplex printed in a predetermined opening direction to minimize a difference between a reproduction image reproduced at each of viewpoints using a plurality of image layers arranged apart from each other and a corresponding one of the input images for the viewpoint. In this case, the inversion unit 234 can be omitted.

Figure 6:
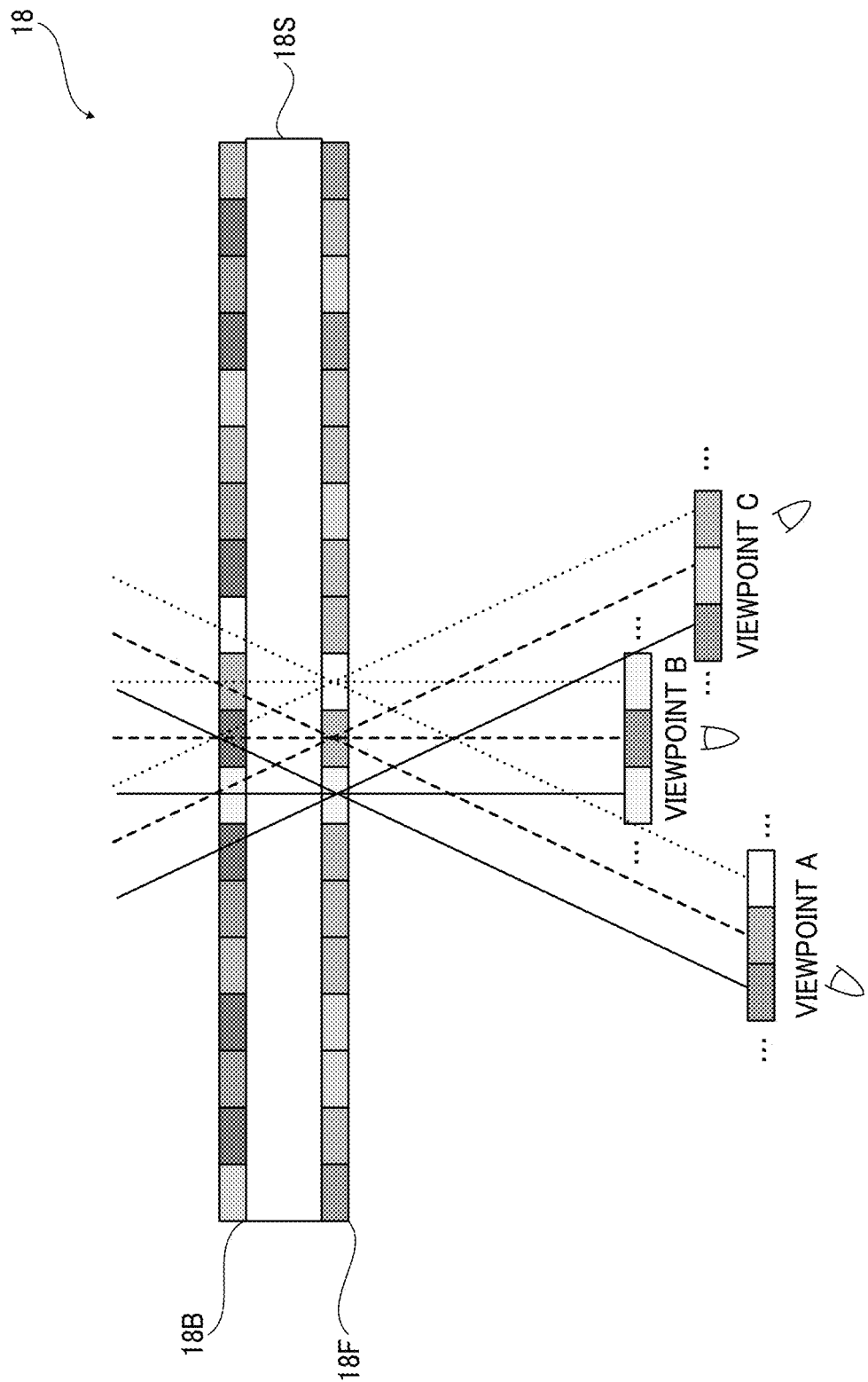
FIG. 6 is a diagram illustrating a light field print with images printed on both sides of a transmissive transfer medium by the light field printing function according to the embodiment.

FIG. 6 illustrates a light field print 18 having images printed on both sides of a transmissive transfer medium 18S such as a transparent sheet by the light field printing function according to the embodiment. In the light field print 18, an image layer 18F of a front-side image 16F is formed on the front side of the transmissive transfer medium 18S, and an image layer 18B of a back-side image 16B is formed on the back side thereof. In addition, since the front and back sides of the transmissive transfer medium 18S are flat and spaced apart from each other, the image layer 18F on the front side and the image layer 18B on the back side are arranged substantially in parallel and apart from each other.

Image formation by the printer 30 is performed by applying and fixing a developer such as toner or ink to both sides of the transmissive transfer medium 18S. By performing image formation on both sides, the operation of bonding transparent layers, which has been performed in JP-T-2018-537046, is no longer required and the light field print 18 can be easily obtained. In addition, deterioration of an image due to entry of air or a material such as an adhesive between the bonded layers can be prevented.

The light field print 18 is based on the principle that the combination of pixels passing through the front-side image 16F and the back-side image 16B differs depending on the viewpoint because the transmissive transfer medium 18S has a certain thickness. By utilizing that the combination of pixels differs depending on the viewpoint, the light intensity can be changed for each viewpoint. Accordingly, it is possible to obtain a print in which images viewed from respective viewpoints are different from each other. An image viewed from such a predetermined observation viewpoint is a reproduced image obtained by light field printing. The reproduced image may be an approximate image of the input image that is determined for each of the angles of the viewpoints with respect to the surface of the transfer medium. The observer can view the approximate images of the corresponding input images one by one by changing the viewing angle of the light field print 18. The positional relationship between the pixels in the combination of pixels through which the line of sight passes defines the viewpoint.

The transmissive transfer medium is a medium that transmits visible light and has two flat transfer surfaces, and includes a case where the medium is a transparent medium and a case where the medium is a semitransparent medium through which printing of a back-side image can be seen through. This is because the intensity of light passing through the front-side image 16F and the back-side image 16B varies depending on the viewpoint even when the image is not completely transparent but is semitransparent.

Figure 7:
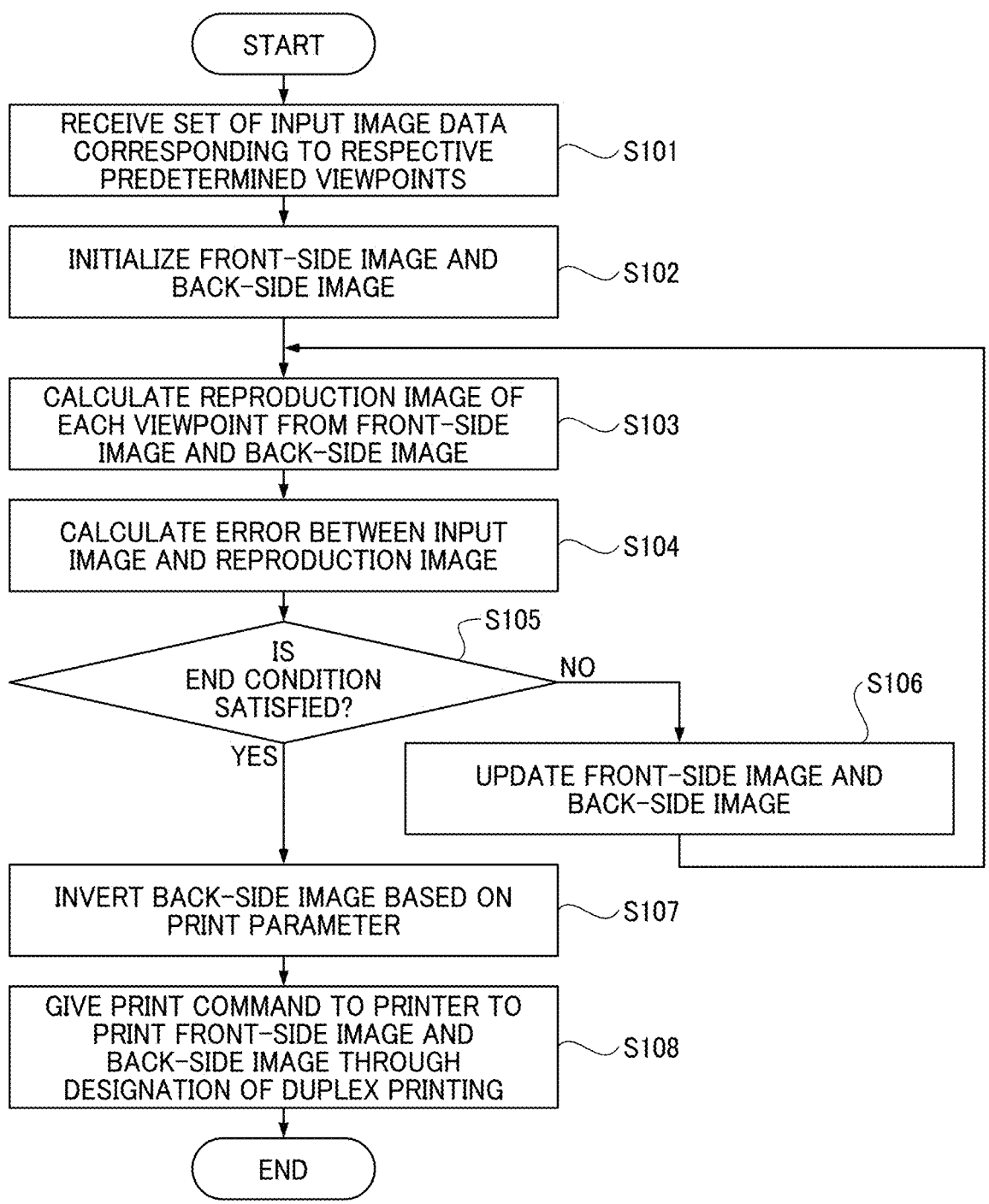
FIG. 7 is a flowchart illustrating a light field printing process that is executed by the information processing apparatus according to the embodiment.

Hereinafter, the light field printing process will be described in more detail with reference to FIGS. 7 and 8. FIG. 7 is a flowchart illustrating the light field printing function that is executed by the information processing apparatus 20 according to the embodiment. The process illustrated in FIG. 7 starts in response to a light field print instruction including designation of an input image set 12.

In step S101, the information processing apparatus 20 receives a set of input image data corresponding to respective predetermined viewpoints. In step S102, the information processing apparatus 20 initializes a front-side image 16F and a back-side image 16B. The optimization process is performed with the initial front-side image and back-side image as starting points. The front-side image and the back-side image during the trial are referred to as a temporary front-side image and a temporary back-side image.

In step S103, the information processing apparatus 20 calculates a reproduction image of each viewpoint from the pair of the temporary front-side image and the temporary back-side image during the trial. In step S104, the information processing apparatus 20 calculates an error between the input image and the reproduced image at each viewpoint, and calculates the total sum of errors over the viewpoints.

In step S105, the information processing apparatus 20 determines whether a predetermined end condition is satisfied. The end condition may be a convergence determination condition that the total sum of errors falls within a certain range, or may be an end condition of detecting that iteration has been performed a predetermined number of times. When it is determined in step S105 that the end condition is not satisfied (NO), the process proceeds to step S106. In step S106, the information processing apparatus 20 updates the temporary front-side image and the temporary back-side image currently being tried, and causes the process to loop to step S103. In step S106, the temporary front-side image and the temporary back-side image can be desirably updated in a direction in which the error decreases.

After the initialization in step S102, step S103 to step S106 are repeated until the end condition is satisfied. Thus, the optimization process is performed with the initial front-side image and back-side image serving as the starting points, and a pair of images are generated such that the input image corresponding to each viewpoint at which the observer observes is at least partly reproduced, or desirably reproduced best, in the transmissive transfer medium in which respective image layers are formed on both sides thereof. The pair of images serve as the pair of the front-side image 16F and the back-side image 16B.

In contrast, when it is determined in step S105 that the end condition is satisfied (YES), the process proceeds to step S107. In step S107, the information processing apparatus 20 inverts the obtained back-side image 16B based on the print setting. The back-side image after the inversion process is referred to as a back-side image 16B'.

FIG. 8 is a table presenting the inversion process based on the print settings by the information processing apparatus 20 according to the embodiment. In the table presented in FIG. 8, the row indicates the direction of the document, and the column indicates the binding direction of duplex printing. Note that each of the four cells having a predetermined gradation in FIG. 8 schematically illustrates the correspondence relationship, and is irrelevant to an actual back-side image or the like. The direction of the document includes vertical and lateral directions. The binding direction of duplex printing includes long-side binding and short-side binding. There is also an opening direction for duplex printing. For example, when the document direction is vertical and long-side binding is performed, the document is opened leftward. When the document direction is vertical and short-side binding is performed, the document is opened upward. When the document direction is lateral and short-side binding is performed, the document is opened leftward. When the document direction is lateral and long-side binding is performed, the document is opened upward. In the case of a vertically written document, the leftward opening is changed to the rightward opening.

In step S107, when the print setting indicates leftward opening or rightward opening, the inversion unit 234 of the information processing apparatus 20 performs left-right inversion on the back-side image. In contrast, when the print setting is upward opening, in step S107, the inversion unit 234 of the information processing apparatus 20 performs up-down inversion on the back-side image. Accordingly, the pair of the front-side image 16F and the back-side image 16B' suitable for the case of duplex printing with the predetermined print settings is generated.

Referring back to FIG. 7, in step S108, the information processing apparatus 20 transmits print data including the obtained front-side image 16F and back-side image 16B' to the printer 30, and commands the printer 30 to duplex print the front-side image 16F and the back-side image 16B'. As described above, in duplex printing, the feed tray that accommodates the transmissive transfer media is designated, duplex printing is designated, and the settings such as the binding direction, the printing direction, and the opening direction may be added.

According to the embodiment described above, it is possible to reduce time and effort for bonding transfer media such as a plurality of transparent layers together. In addition, since image layers are accurately formed on the front and back sides of a transfer medium so as to be arranged apart from each other, it is possible to prevent an air layer or a material such as an adhesive from entering between the bonded media, and it is possible to reduce deterioration of a reproduced image. Further, a transmissive transfer medium having image layers formed on both sides thereof has an image to be observed that changes as the viewpoint changes. Such a transmissive transfer medium can be used for a stereoscopic expression and a wide range of expressions and applications. With the above-described configuration, it is possible to create a print having an image that changes depending on the observation viewpoint without time and effort. Also in the case of using a plurality of transmissive transfer media, the operation of bonding is reduced by duplex printing, and hence deterioration of an image is prevented.

Second Embodiment

In the above description, position alignment accuracy between a front-side image and a back-side image in duplex printing has not been particularly mentioned. In duplex printing by the printer 30, an error in position alignment generally occurs between pixels on both sides. Further, in the printer 30, the main-scanning direction (non-conveyance direction) and the sub-scanning direction (conveyance direction) are not mechanically symmetrical. Thus, in duplex printing, the position alignment accuracy in the conveyance direction generally differs from the position alignment accuracy in the non-conveyance direction. Hereinafter, with reference to FIGS. 9 to 11B, a description will be given of a second embodiment capable of preventing deterioration in quality of a print due to the position alignment accuracy of duplex printing.

Figure 9:
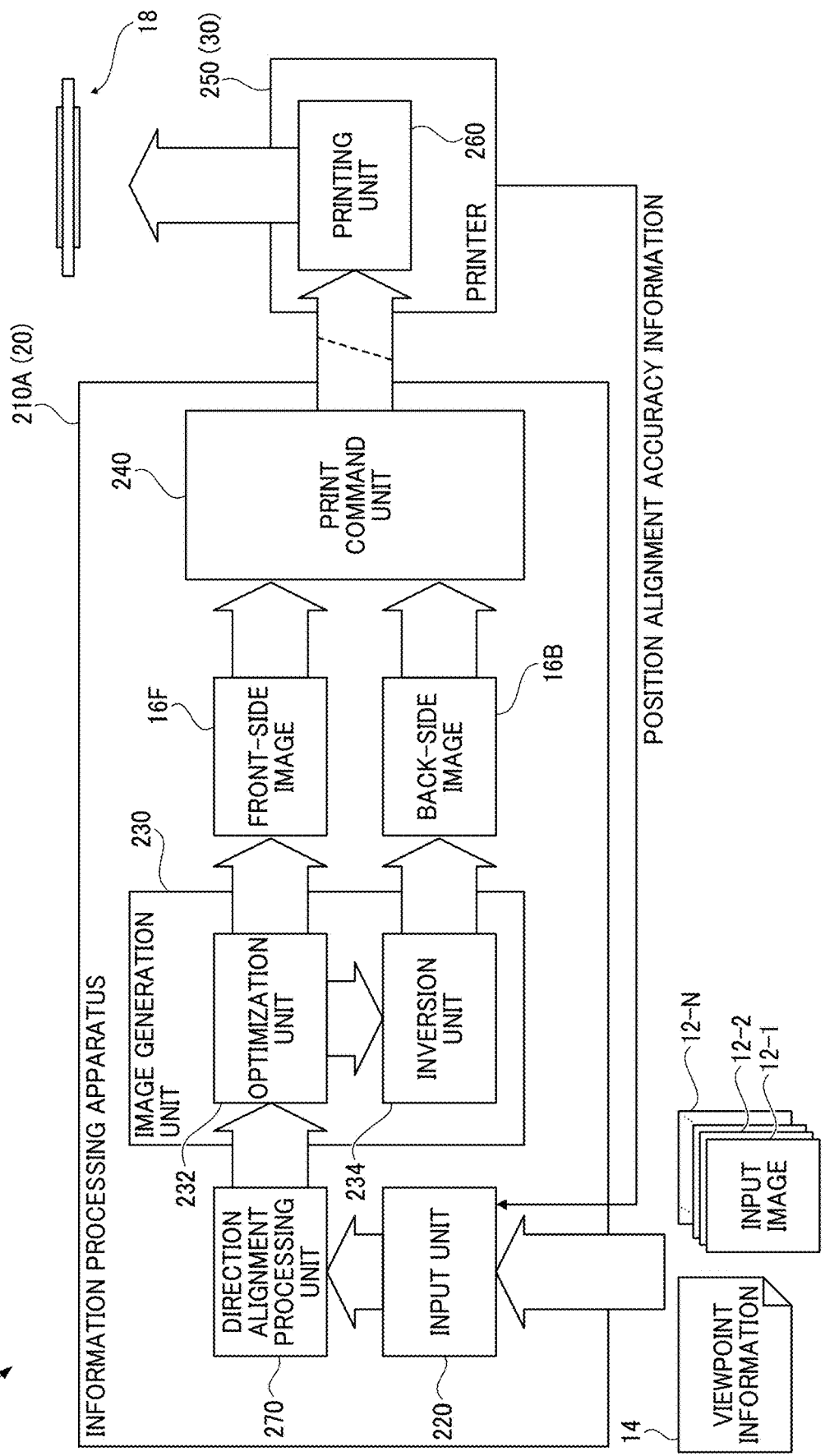
FIG. 9 is a diagram illustrating functional blocks provided on an information processing apparatus and a printer for implementing a light field printing function according to a second embodiment.

FIG. 9 is a diagram illustrating functional blocks provided on an information processing apparatus 20 and a printer 30 for implementing a light field printing function according to the second embodiment. Since the second embodiment has a configuration similar to that of the embodiment illustrated in FIG. 5, the following description will focus on the differences. Elements having functions similar to those in the embodiment illustrated in FIG. 5 are denoted by the same reference numerals.

In the embodiment illustrated in FIG. 9, a functional block 210A of the information processing apparatus 20 includes a direction alignment processing unit 270 in addition to the input unit 220, the image generation unit 230, and the print command unit 240.

The input unit 220 according to the embodiment receives an input image set 12 and viewpoint information 14, and passes the input image set 12 and viewpoint information 14 to the direction alignment processing unit 270. In the input image set 12 according to the embodiment, it is assumed that the number of viewpoints in the vertical direction differs from the number of viewpoints in the lateral direction. A larger number of viewpoints are allocated in one of the vertical and lateral directions than that in the other direction. For example, when a plurality of viewpoints are set only in the lateral direction of an input image, the lateral direction is a direction in which viewpoints are allocated more. When a plurality of viewpoints are set only in the vertical direction of an input image, the vertical direction is a direction in which viewpoints are allocated more. Further, when viewpoints of M×N are set in the vertical and lateral directions of an input image, the direction in which a larger number of M and N of viewpoints are allocated is the direction in which viewpoints are allocated more.

In the printing unit 260 according to the embodiment, it is assumed that the position alignment accuracy of duplex printing in the conveyance direction of a medium differs from that in the non-conveyance direction of the medium. Whether the position alignment accuracy in the conveyance direction is higher or the position alignment accuracy in the non-conveyance direction is higher depends on the specific configuration (model or the like) of the printer 30.

In response to an inquiry from the information processing apparatus 20, the printer 30 returns information indicating the position alignment accuracy in the conveyance direction and the non-conveyance direction. The information indicating the position alignment accuracy may be information directly indicating the position alignment accuracy in each of the conveyance direction and the non-conveyance direction, may be information indicating which one of the conveyance direction and the non-conveyance direction has a higher position alignment accuracy, or may be information associated with the information on the position alignment accuracy in the conveyance direction and the non-conveyance direction by being combined with other known information such as model information. The information indicating the position alignment accuracy is also input to the input unit 220. The way of providing the information indicating the position alignment accuracy is not limited to the way in which the printer 30 in FIG. 9 provides the information indicating the position alignment accuracy in response to the inquiry of the information processing apparatus 20. The information indicating the position alignment accuracy may be acquired when the information processing apparatus 20 receives a user input.

Figure 10A:
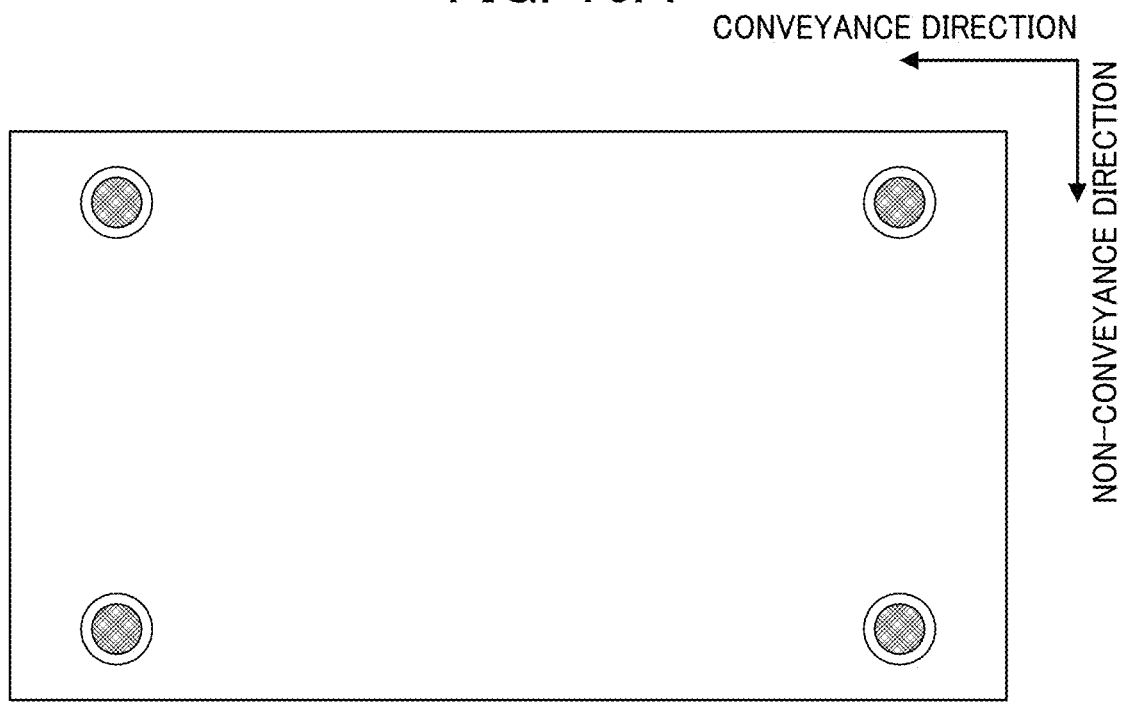
FIGS. 10A and 10B are diagrams each illustrating position alignment accuracy of a light field print according to the second embodiment.
Figure 10B:
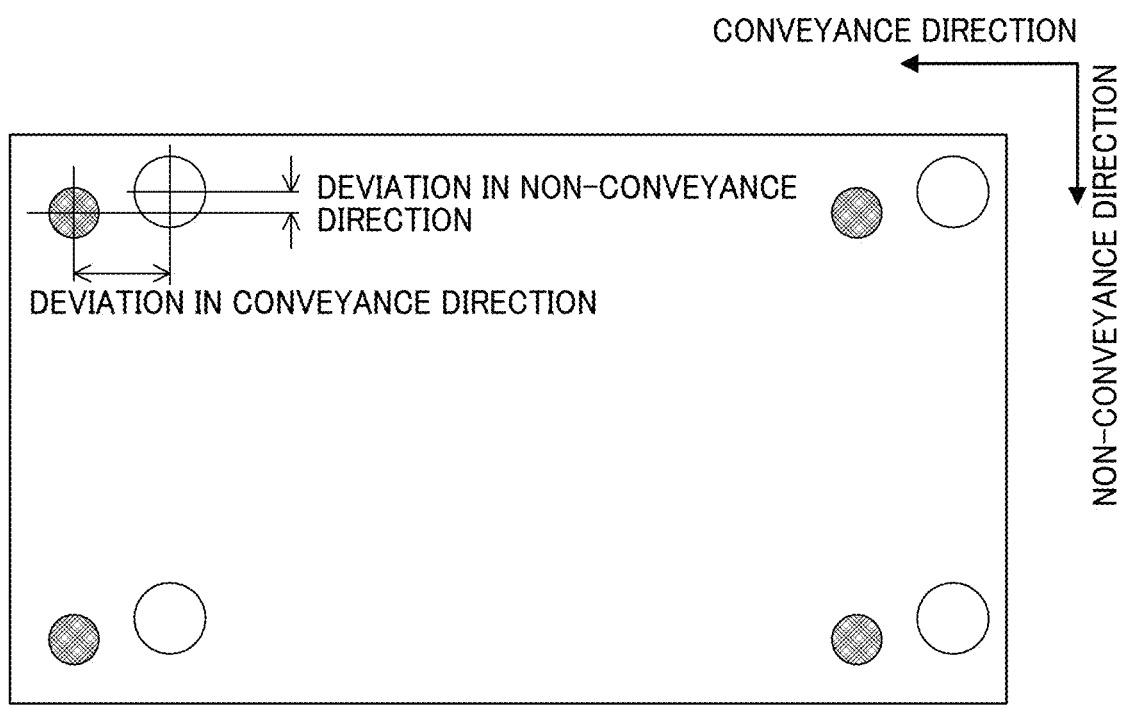

FIGS. 10A and 10B are diagrams each illustrating the position alignment accuracy of a light field print 18 according to the embodiment. FIG. 10A illustrates an ideal case where the positions of images on the front and back sides are aligned, and FIG. 10B schematically illustrates a case where images have a deviation of position alignment observed when the images are actually printed.

The printer 30 conveys a transfer medium and performs printing on both sides of the transfer medium. However, as described above, since the conveyance direction and the non-conveyance direction are not mechanically symmetrical, the accuracy in terms of the positional deviation of pixels between the front side and the back side in the conveyance direction differs from that in the non-conveyance direction. That is, having a high accuracy in each of the directions differs from having a small deviation.

Figure 11A:
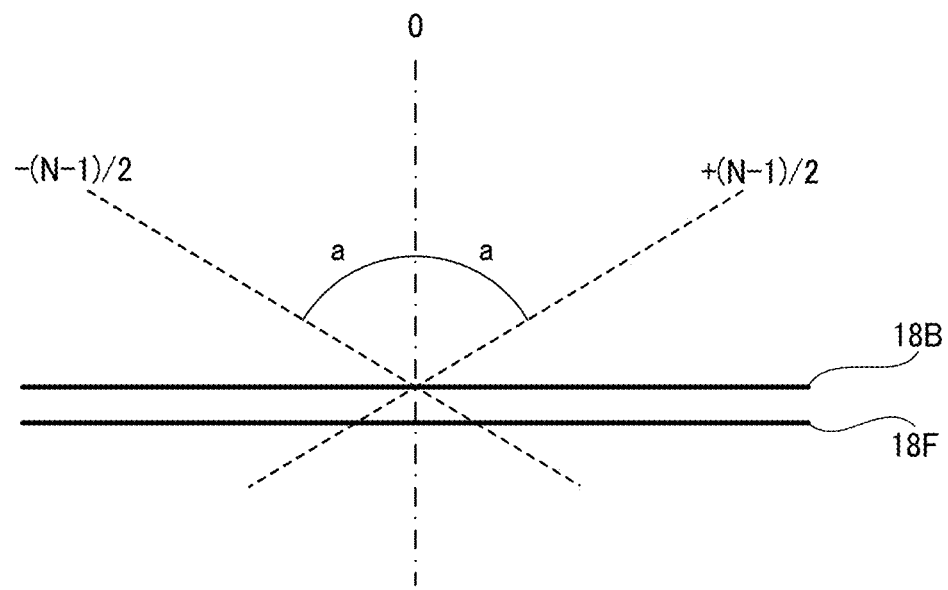
FIGS. 11A and 11B are diagrams each illustrating an influence on a light field print occurring due to a positional deviation between a front side and a back side.
Figure 11B:
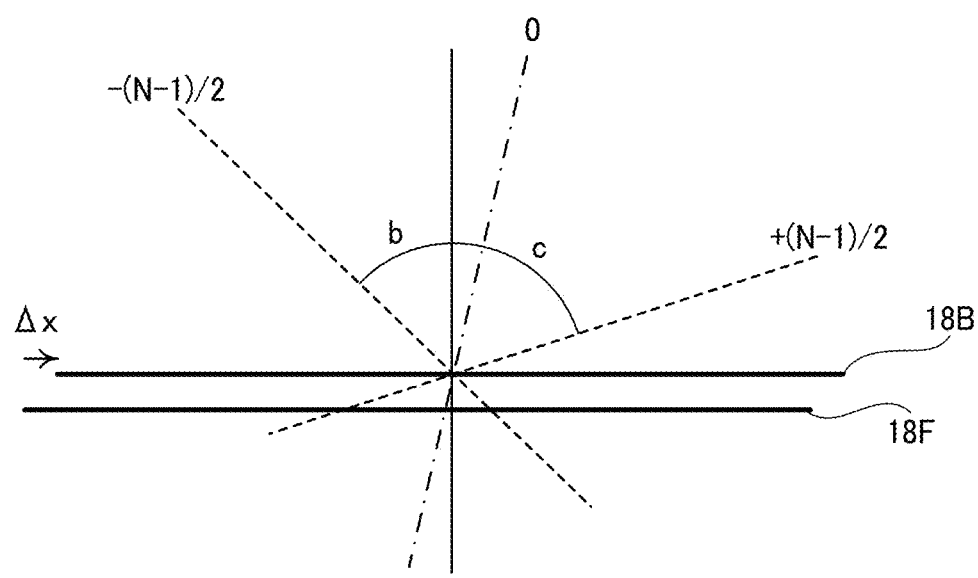

FIGS. 11A and 11B are diagrams each illustrating an influence on a light field print 18 due to a positional deviation between the front side and the back side.

When a positional deviation is generated, an image observed from each viewpoint in the light field print 18 may be inclined from the image illustrated in FIG. 11A to the image illustrated in FIG. 11B. The larger the deviation, the larger the inclination. Accordingly, there may occur a situation where any viewpoint image is not viewable from the front of the light field print 18, or a situation where any viewpoint image becomes not viewable when the viewpoint is slightly inclined from the front of the light field print 18. An observer typically views the light field print 18 from the front when holding the light field print 18. Thus, when the deviation is large, any viewpoint image is no longer viewable from the vicinity of the front, and the observer may determine the light field print 18 as a defective product.

Therefore, in the embodiment described here, in order to increase the rate of non-defective products of the light field print 18, duplex printing is performed by matching the direction in which viewpoints are allocated more with one of the conveyance direction and the non-conveyance direction in which the position alignment accuracy between the front side and the back side is lower.

Increasing the number of viewpoints can widen the viewing angle, and widening the viewing angle can increase the rate at which a viewpoint image within a certain angle from the front is viewed even when a deviation is generated, that is, the rate at which the light field print 18 is determined as a non-defective product. However, increasing the number of viewpoints deteriorates reproducibility of an image. Thus, in view of reproducibility, the number of viewpoints is desirably small. Thus, in the second embodiment to be described, in order to reduce the degree of deterioration in reproducibility as much as possible while increasing the rate of non-defective products, as described above, the allocation of the numbers of viewpoints is changed depending on the accuracy in terms of the positional deviation between the front side and the back side, and viewpoints are allocated more in the direction in which the position alignment accuracy is lower.

The direction alignment processing unit 270 provides a function of matching the direction of the image with the direction of the position alignment accuracy. More particularly, based on the information indicating the position alignment accuracy and the viewpoint information 14, the direction alignment processing unit 270 performs a process such that the direction in which viewpoints are allocated more matches one of the conveyance direction and the non-conveyance direction in which the position alignment accuracy is lower. The process may be a process of rotating an image in accordance with a conditional branch.

For example, when the lateral direction is the direction in which viewpoints are allocated more, the lateral direction corresponds to the conveyance direction, and the position alignment accuracy in the conveyance direction is lower than the position alignment accuracy in the non-conveyance direction, the direction alignment processing unit 270 passes the input image set 12 to the image generation unit 230 without performing any particular process. In contrast, for example, when the vertical direction is the direction in which viewpoints are allocated more, the lateral direction corresponds to the conveyance direction, and the position alignment accuracy in the conveyance direction is lower than the position alignment accuracy in the non-conveyance direction, the direction alignment processing unit 270 rotates images of the input image set 12 clockwise (or counterclockwise) by 90 degrees, and passes the input image set 12 whose images have been rotated to the image generation unit 230.

In the embodiment described here, the direction alignment process is performed on the input image set 12 before image generation. The timing of the direction alignment process is not limited thereto. In another embodiment, the direction alignment process may be performed on the front-side image 16F and the back-side image 16B after image generation. Further, when images can be rotated as a function of the printer driver or the printer 30, instead of issuing a print command after performing an image rotation process on images, a print setting indicating that the front-side image 16F and the back-side image 16B are rotated by 90 degrees and printed can be added to the print command. In addition, the conveyance direction and the non-conveyance direction with respect to the image can be also changed by designating the direction of the document.

The larger the number of viewpoints, the wider the viewing angle and range in which the image is viewable. By performing the above-described direction alignment process, the direction in which the position alignment accuracy is lower can be matched with the direction in which the viewing angle and the range are wider. Thus, even when a positional deviation in pixels is generated between the front side and the back side, it is possible to properly observe the image in a range in which the angle is slightly changed from the front. Accordingly, deterioration in quality of a print can be prevented, and the yield is also improved.

Modifications of Second Embodiment

In the above-described second embodiment, the direction in which viewpoints are allocated more is matched with one of the non-conveyance direction and the conveyance direction in which the position alignment accuracy is lower, thereby reducing the rate of defective products due to the positional deviation. Alternatively, decreasing the resolution of an image can also widen the viewing angle without changing the number of viewpoints. Thus, by generating each of the front-side image and the back-side image to have different resolutions in the vertical and lateral directions and by printing the images while the direction in which the resolution is lower is matched with the direction in which the position alignment accuracy of the front and back sides is lower, the rate of determination as a non-defective product can be increased.

Hereinafter, with reference to FIGS. 12A and 12B, a description will be given of a modification of the second embodiment capable of preventing deterioration in quality of a print due to the position alignment accuracy of duplex printing. Since the modification has a configuration similar to that of the second embodiment, the modification will be described below with reference to the functional blocks of the second embodiment. Also in an embodiment of the modification, the direction alignment processing unit 270 provides a function of performing a process corresponding to position alignment accuracy.

Figure 12A:
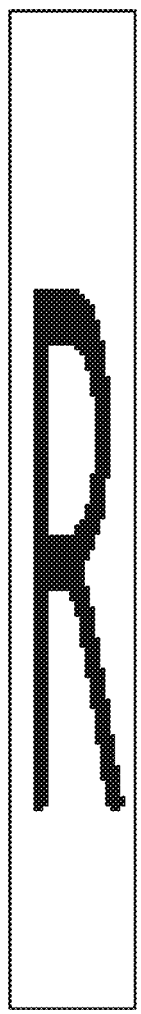
FIGS. 12A and 12B are diagrams illustrating input images according to another embodiment.
Figure 12B:
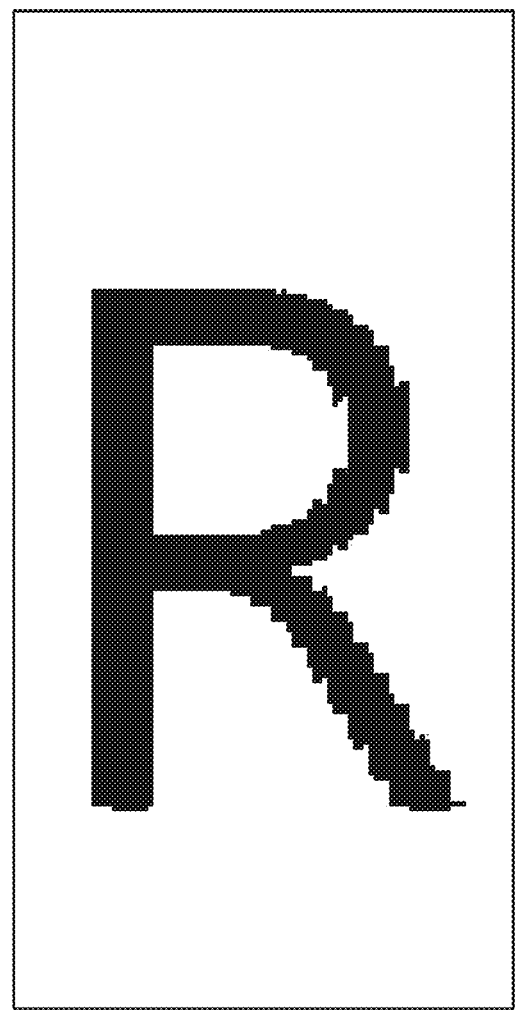

FIGS. 12A and 12B are diagrams illustrating input images according to another embodiment. FIG. 12A illustrates an input image whose resolution in one direction is decreased. The input unit 220 according to the embodiment of the modification described here receives an input image set 12 and viewpoint information 14, and passes the input image set 12 and viewpoint information 14 to the direction alignment processing unit 270. In the input image set 12, it is assumed that the input images each have different resolutions in the vertical and lateral directions as illustrated in FIG. 12A, and a set corresponding to the input images with the different resolutions is prepared. In the printing unit 260 according to the embodiment, it is also assumed that the position alignment accuracy of duplex printing in the conveyance direction of a medium differs from that in the non-conveyance direction of the medium. The input unit 220 also receives information indicating the position alignment accuracy. The resolution in the lateral direction (with reference to an orientation in which an English character R in the image stands upright) is low, and hence FIG. 12A illustrates a rectangular image having pixels each being laterally elongated. However, FIG. 12A illustrates an image indicating pixels each having a square shape corresponding to the resolution in the vertical direction.

The direction alignment processing unit 270 according to the embodiment performs a process based on the information on the resolution of the input image and the information indicating the position alignment accuracy such that the direction in which the resolution is lower matches one of the conveyance direction and the non-conveyance direction in which the position alignment accuracy is lower. The process may be a process of rotating an image in accordance with a conditional branch like the second embodiment.

For example, when the lateral direction is the direction in which the resolution is lower, the lateral direction corresponds to the conveyance direction, and the position alignment accuracy in the conveyance direction is lower than the position alignment accuracy in the non-conveyance direction, the direction alignment processing unit 270 passes the input image set 12 to the image generation unit 230 without performing any particular process. In contrast, for example, when the vertical direction is the direction in which the resolution is lower, the lateral direction corresponds to the conveyance direction, and the position alignment accuracy in the conveyance direction is lower than the position alignment accuracy in the non-conveyance direction, the direction alignment processing unit 270 rotates images of the input image set 12 clockwise (or counterclockwise) by 90 degrees, and passes the input image set 12 whose images have been rotated to the image generation unit 230.

By performing the optimization calculation based on the input images having different resolutions in the vertical and lateral directions, a front-side image 16F and a back-side image 16B having different resolutions in the vertical and lateral directions are generated, and printing can be performed based thereon.

In the embodiment described here, the direction alignment process is performed on the input image set 12 before image generation. The timing of the direction alignment process is not limited thereto. In another embodiment, the direction alignment process may be performed on the front-side image 16F and the back-side image 16B after image generation. Further, when images can be rotated as a function of the printer driver or the printer 30, instead of issuing a print command after performing the image rotation process on an image, a print setting indicating that the front-side image 16F and the back-side image 16B are rotated by 90 degrees and printed can be added to the print command. In addition, the conveyance direction and the non-conveyance direction with respect to the image can be also changed by designating the direction of the document.

In addition, since the printing unit 260 of the printer 30 normally performs printing with the same resolution in the vertical and lateral directions, the printing unit 260 performs printing after performing a resolution conversion process of returning the aspect ratio to the original aspect ratio as illustrated in FIG. 12B on the front-side image 16F and the back-side image 16B. Note that the predetermined images in FIGS. 12A and 12B are schematically illustrated, and are irrelevant to an actual input image, a front-side image, a back-side image, or the like.

The lower the resolution, the wider the viewing angle and range in which the image is viewable. By performing the above-described direction alignment process, the direction in which the position alignment accuracy is lower can be matched with the direction in which the viewing angle and the range are wider. Thus, even when a positional deviation in pixels is generated between the front side and the back side, it is possible to properly observe the image in a range in which the angle is slightly changed from the front. Accordingly, deterioration in quality of a print can be prevented, and the yield is also improved.

In the above description, it is assumed that the process of matching the direction in which the resolution is lower with one of the conveyance direction and the non-conveyance direction in which the position alignment accuracy is lower according to the embodiment of the modification is independently performed. However, in another embodiment, in addition to the process of matching the direction in which the resolution is lower, a process of matching to the direction in which viewpoints are allocated more according to the second embodiment may be performed.

In this case, it is possible to determine which direction is to be aligned with the direction in which the position alignment accuracy is lower, by the number of substantial vertical and lateral viewpoints regarding the ratio of the vertical and lateral resolutions of the input image. For example, the resolution of each input image is (600 dpi in the lateral direction)×(200 dpi in the vertical direction). When an input image set 12 having 17 viewpoints in the lateral direction and 5 viewpoints in the vertical direction is used, the following is established. That is, since the viewpoints in the vertical direction are equivalent to 5 viewpoints×(600/200)=15 viewpoints with respect to 17 viewpoints in the lateral direction, the lateral direction can be matched to a direction in which the positioning accuracy is lower.

That is, the direction alignment processing unit 270 can match a direction in which the number of substantial viewpoints obtained based on the ratio of the resolutions in the vertical direction and the lateral direction and the numbers of viewpoints in the vertical direction and the lateral direction is larger, with one of the conveyance direction and the non-conveyance direction in which the position alignment accuracy is lower.

Third Embodiment

In the light field printing, since input images of a plurality of viewpoints, typically, input images of three or more viewpoints are reproduced by two images, information on input images corresponding to the number of viewpoints is compressed into two images. Thus, reproducibility may be defective for a certain type of input image. That is, there is a possibility that the light field printing is appropriate or not depending on the characteristics of the input image, a change in image is not sufficiently reproduced at the time of printing, or image deterioration such as an afterimage is apparent. A third embodiment capable of determining whether an input image is appropriate or not will be described below with reference to FIGS. 13 to 14E.

Figure 13:
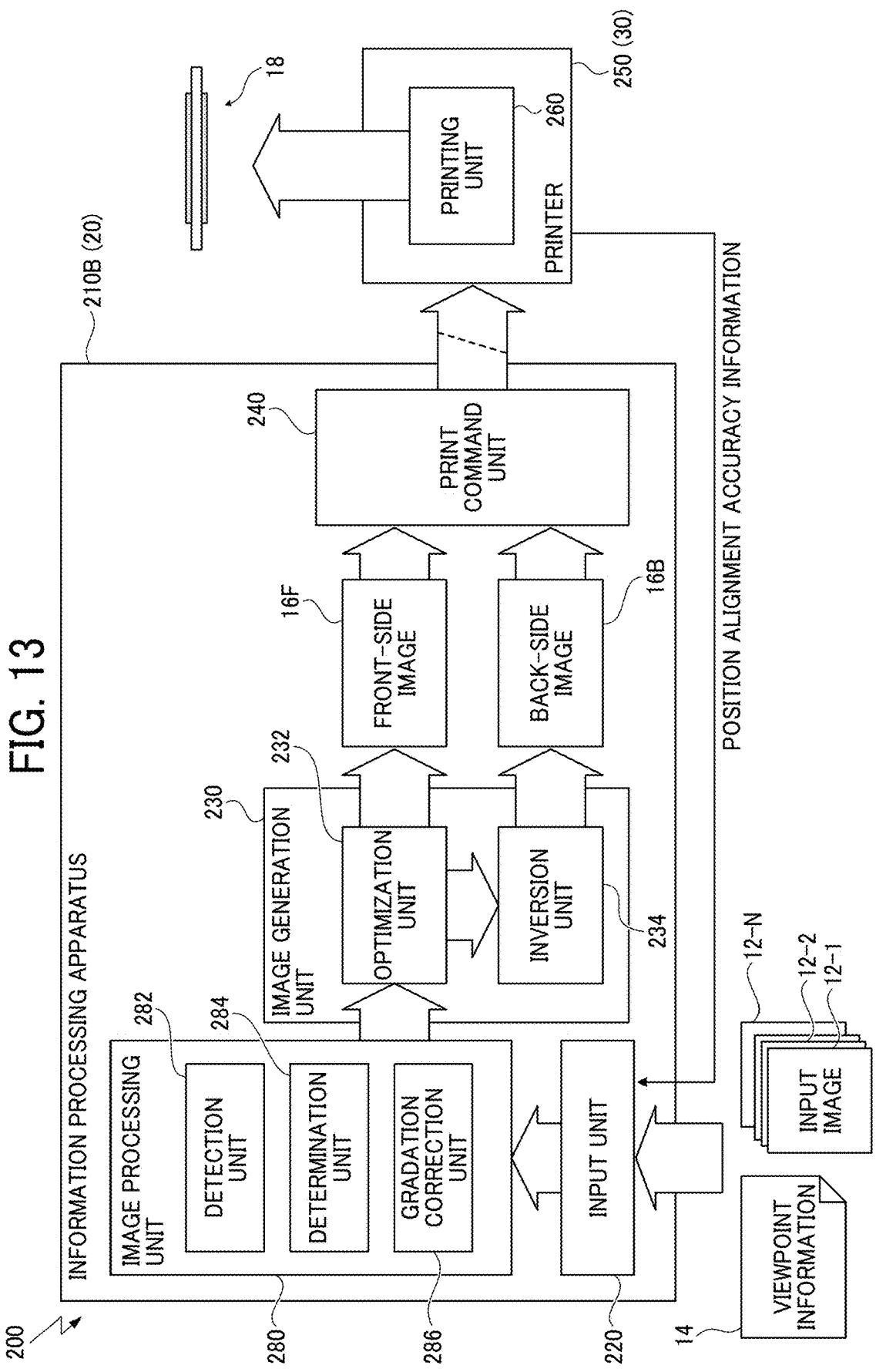
FIG. 13 is a diagram illustrating functional blocks provided on an information processing apparatus and a printer for implementing a light field printing function according to a third embodiment.

FIG. 13 is a diagram illustrating functional blocks provided on an information processing apparatus 20 and a printer 30 for implementing a light field printing function according to the third embodiment. Since the third embodiment has a configuration similar to that of the embodiment illustrated in FIG. 5, the following description will focus on the differences. Elements having functions similar to those in the embodiment illustrated in FIG. 5 are denoted by the same reference numerals.

In the embodiment illustrated in FIG. 13, a functional block 210B of an information processing apparatus 20 includes an image processing unit 280 in addition to the input unit 220, the image generation unit 230, and the print command unit 240. In the embodiment described here, it is assumed that the direction alignment processing unit 270 provided in the second embodiment or the modification thereof is not provided. However, the position alignment processing unit 270 may be provided.

More particularly, the image processing unit 280 includes a detection unit 282 and a determination unit 284.

Figure 14A:
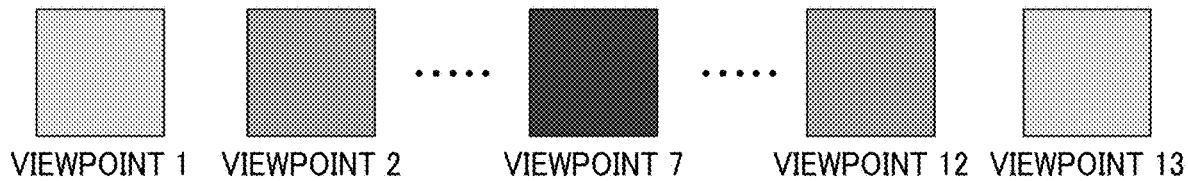
FIGS. 14A to 14E are a diagram and graphs presenting a change in image transmissivity over a plurality of viewpoints of a print obtained by the light field printing function.

FIGS. 14A to 14E are a diagram and graphs presenting a change in image transmissivity over a plurality of viewpoints of a print obtained by the light field printing function. FIG. 14A illustrates input images for 13 viewpoints. The example illustrated in FIG. 14A represents input images in which the density (image transmissivity when printed on a transparent sheet) is uniform and the density appears to change when the viewpoint is changed. In FIG. 14A, 13 viewpoints are set in one direction. FIG. 14A illustrates an input image set 12 which becomes gradually lighter and brighter as the viewpoint is changed from a state viewed from the front (viewpoint 7) to a state viewed obliquely (viewpoint 1 or viewpoint 13). For convenience of explanation, the images are illustrated as gray scale images, but in the case of color images, the density changes depending on each color version.

Figure 14B:
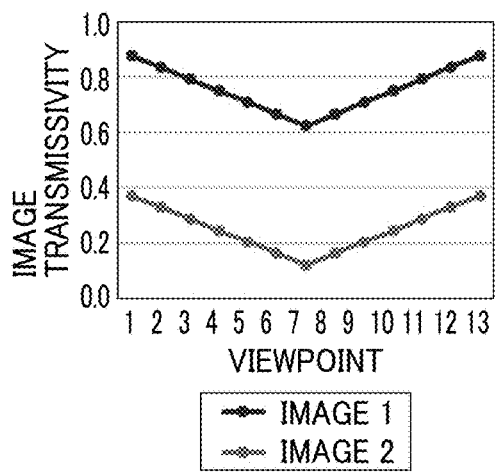
Figure 14C:
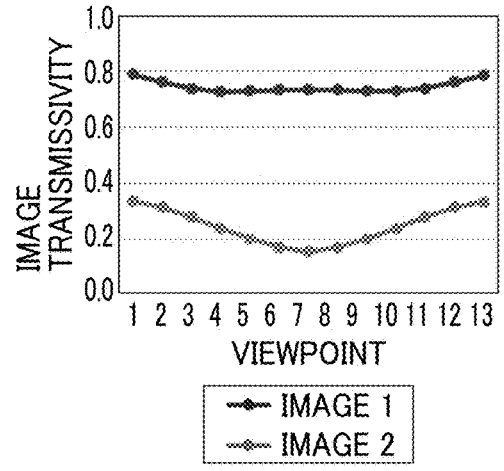
Figure 14D:
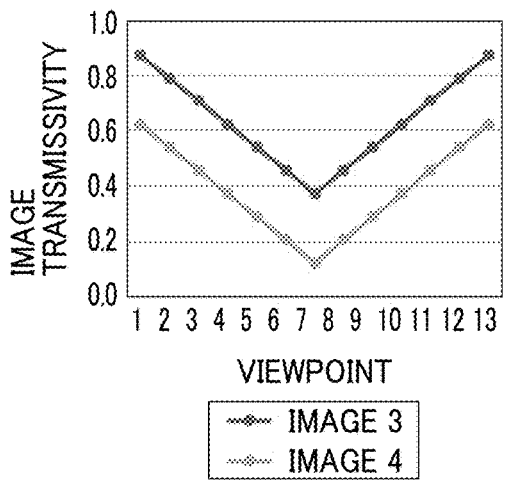

FIGS. 14B and 14D present four input image sets 12 exhibiting changes similar to those in FIG. 14A, and plots the density (image transmissivity) of each input image set 12 with respect to the viewpoint. In FIGS. 14B to 14E, the vertical axis represents the image transmissivity of the input image. In this case, the image transmissivity of 1.0 represents white, and the image transmissivity of 0.0 represents black. The horizontal axis corresponds to each viewpoint of the 13 viewpoints.

An "image 1" is an input image set in which the transmissivities at the viewpoints 1 and 13 at both ends are 0.37 and the transmissivity at the viewpoint 7 in the front is 0.12. The amount of change in transmissivity is 0.25. An "image 2" is an image in which the amount of change in transmissivity is 0.25 similarly to the image 1, but is lighter than the "image 1" as a whole. An "image 3" and an "image 4" both have a change in transmissivity of 0.50; however, the "image 3" is a darker image as a whole. That is, among the four sets, two sets indicated by the "image 1" and the "image 2" have the same difference in density between the viewpoint 7 in the front and the viewpoint 1 (viewpoint 13); however, the "image 2" is offset in a direction in which the image is brighter. Two sets indicated by the "image 3" and the "image 4" also have the same difference in density between the viewpoint 7 in the front and the viewpoint 1 (viewpoint 13); however, the "image 4" is offset in a direction in which the image is brighter. The "image 1" and the "image 2" are different from the "image 3" and the "image 4" for the difference in density between the viewpoint 7 in the front and the viewpoint 1 (viewpoint 13). The sets of the "image 3" and the "image 4" have larger changes in density.

Figure 14E:
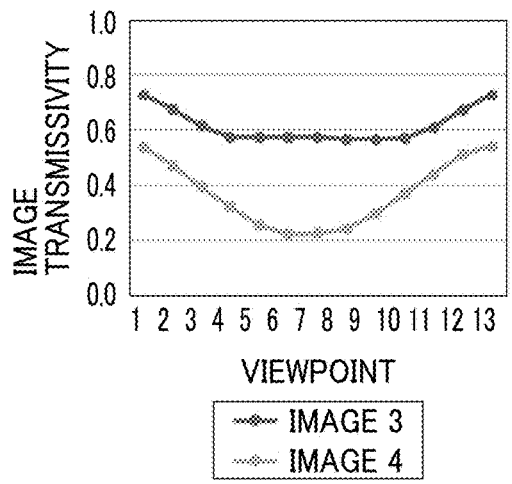

FIGS. 14C and 14E present simulated densities (transmissivities) of reproduced images at respective viewpoints obtained from the front-side image and the back-side image when the four input image sets of FIGS. 14B and 14D are used. As illustrated in FIG. 14C, the reproduced image of the "image 1" can reproduce the change in image of the input image (the "image 1" in FIG. 14B), that is, about 75% of the value (the maximum value–the minimum value) of the transmissivities. In contrast, in the reproduced image of the "image 2", about 25% of the change in image of the input image (the "image 2" in FIG. 14B) is reproduced. The reproduced image of the "image 3" can reproduce the change in image of the input image (the "image 3" in FIG. 14D), that is, about 65% of the value (the maximum value–the minimum value) of the transmissivities. In contrast, in the reproduced image of the "image 4", about 30% of the change in image of the input image (the "image 4" in FIG. 14D) is reproduced.

Regarding the above, in the light field printing, even when the change in density of the input image is small, the reproducibility is not necessarily improved. The "image 2" has a half of the change in image due to the viewpoint as compared with the "image 3", and the change is small; however the reproducibility of the "image 2" is not good. In contrast, the reproducibility of the "image 1" is good in spite of that the "image 1" has twice as much change in image as the "image 4" due to the viewpoint and the change is large. Then, when the front-side image and the back-side image generated by the "image 1" and the "image 3" are actually printed by a printer and checked, the image quality is sufficient.

Thus, in order to obtain a high-quality image by the light field printing, it is desirable to use an input image in which the transmissivity of the image at the brightest viewpoint is about 0.6 or less. The value 0.6 does not mean that the reproducibility rapidly deteriorates if exceeds this value even slightly, and therefore the value is not a strict threshold value and includes a case where the value exceeds the threshold value to such an extent that there is no difference when viewed by human eyes. Since an input image can be faithfully reproduced regardless of the image density in an image region in which the image does not change even when the viewpoint changes, there is no problem although an image brighter than the above-described transmissivity of 0.6 is included. The situation "the image does not change depending on the viewpoint" includes a case where a change is so small that the change is not recognized by human eyes.

Based on the above, the detection unit 282 in the image processing unit 280 according to the third embodiment detects, in the input image set 12, an image region in which a change in image is generated by an amount greater than or equal to a determined amount in accordance with a change in viewpoint. An image region in which a change in image generated by an amount equal to or greater than a determined amount can be detected by examining the distribution of gradation levels over all viewpoints for each pixel of an input image. For example, the detection unit 282 can detect such an image region by comparing the difference between the brightest gradation level and the darkest gradation level across all viewpoints with a predetermined threshold value for each pixel. As long as the difference between the brightest gradation level and the darkest gradation level is small, it represents that the change in image is small although the viewpoint changes. Alternatively, the detection unit 282 can detect such an image region by calculating the total sum of differences in gradation level between adjacent viewpoints for each pixel.

The determination unit 284 determines whether a gradation level over a plurality of viewpoints in an image region in which a change in image is generated by an amount equal to or greater than a determined amount falls within a predetermined darkness range. The determination of whether to fall within the predetermined darkness range may be based on that the image transmissivity for the gradation level that is significantly the brightest among the gradation levels at all the viewpoints in the image region in which a change in image is generated by an amount equal to or greater than the determined amount is 0.6 or less. For example, the determination unit 284 counts the number of appearances of the gradation level of each image region in which a change in image is generated by an amount equal to or greater than the determined amount, and creates a histogram. Then, the determination unit 284 detects the brightest gradation level among the gradation levels having a certain frequency or higher, and compares the detected gradation level with the threshold value of the image transmissivity of 0.6. Accordingly, the determination unit 284 can determine whether or not the gradation level falls within the predetermined darkness range.

Note that a countermeasure when the determination unit 284 determines that the gradation level does not fall within the predetermined darkness range is not particularly limited. In a certain embodiment, printing may be stopped and the user may be notified of an error or warning. Alternatively, while printing is continued, the user may be notified of an error or warning. In a desirable embodiment, when it is determined that the gradation level does not fall within the predetermined darkness range, image processing can be performed on the input image so that the gradation level falls within the predetermined darkness range.

FIG. 13 illustrates a desirable embodiment, and the image processing unit 280 further includes a gradation correction unit 286. When the gradation level does not fall within the predetermined darkness range, the gradation correction unit 286 performs gradation correction on the input image set 12 in a stage before the front-side image and the back-side image are generated. For the gradation process, for example, a gradation process such as of a tone curve can be performed so that the brightest gradation level among those having a certain frequency or higher in the above-described histogram falls within the threshold value of the image transmissivity of 0.6.

According to the above-described configuration, by limiting or correcting the characteristics of the input image to a range in which the characteristics can be properly reproduced by the light field printing, a change in image due to the viewpoint can be reliably reproduced, while preventing deterioration in image quality such as an afterimage.

As described above, according to the embodiments described above, an information processing apparatus, an image processing method, an image processing program, and a printing system are provided, each capable of creating a print whose image changes depending on an observation viewpoint, with increased efficiency.

The apparatus according to the above-described embodiments is merely illustrative of one of a plurality of computing environments for implementing the embodiments disclosed in the description. In one embodiment, an information processing apparatus includes a plurality of computing devices, such as a server cluster. The plurality of computing devices are configured to communicate with each other via any type of communication link, including a network, a shared memory, or the like and perform the processes disclosed in the description. Respective elements of the information processing apparatus may be integrated into one computing device or may be divided into a plurality of devices.

Each of the functions of the described embodiments may be implemented by one or more processing circuits or circuitry. Processing circuitry includes a programmed processor, as a processor includes circuitry. A processing circuit also includes devices such as an Application Specific Integrated Circuit (ASIC), a digital signal processor (DSP), a field programmable gate array (FPGA), and conventional circuit components arranged to perform the recited functions.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The invention claimed is:

1. An information processing apparatus comprising:
circuitry configured to:
receive a plurality of input images corresponding to respective viewpoints;
generate, based on the plurality of input images, a first output image and a second output image such that at least part of one of the input images corresponding to each of the viewpoints is reproduced when the first output image and the second output image are printed by duplex printing on at least one transmissive transfer medium having a plurality of image layers on both sides thereof;
instruct a printer to print the first output image and the second output image by duplex printing, a position alignment accuracy of the duplex printing for the printer differing between a conveyance direction of a medium and a non-conveyance direction of the medium, and the printer having a direction in which a number of viewpoints having been allocated is larger; and
match the direction having the larger number of viewpoints with one of the conveyance direction or the non-conveyance direction having the position alignment accuracy that is lower.

2. The information processing apparatus according to claim 1, wherein the circuitry is configured to:
generate the first output image and the second output image by
generating a pair of images, based on the plurality of the input images, such that a difference between a reproduced image reproducing each of the viewpoints by the plurality of image layers apart from each other, and an input image corresponding to each of the viewpoints is minimized, and
performing image inversion on one of the pair of images in accordance with an opening direction of the duplex printing.

3. The information processing apparatus according to claim 1, wherein the circuitry is configured to optimize the first output image and the second output image based on the plurality of input images to minimize a difference between a reproduced image reproducing each of the viewpoints by the plurality of image layers apart from each other, and an input image corresponding to each of the viewpoints, under a condition that the plurality of image layers are printed by the duplex printing to be opened in a predetermined opening direction.

4. The information processing apparatus according to claim 1,
wherein the first output image and the second output image each have a resolution in a vertical direction and a resolution in a lateral direction, the resolutions differing from each other, and
wherein the circuitry is configured to match one of the vertical direction or the lateral direction having the resolution that is lower, with one of the conveyance direction or the non-conveyance direction of the printer having the position alignment accuracy that is lower.

5. The information processing apparatus according to claim 1,
a number of viewpoints and a resolution of each of the plurality of input images each differs between a vertical direction and a lateral direction, and
the circuitry is configured to
obtain a number of substantial viewpoints based on a ratio of the resolutions and the numbers of viewpoints in the vertical direction and the lateral direction, and
match one of the vertical direction or the lateral direction in which the number of substantial viewpoints is larger, with one of the conveyance direction or the non-conveyance direction having the position alignment accuracy that is lower.

6. The information processing apparatus according to claim 1, wherein the circuitry is configured to:
detect an image region in which a change in image is generated by an amount equal to or greater than a determined amount in accordance with a change in viewpoint in the plurality of input images; and
determine whether a gradation level over a plurality of viewpoints in the image region in which the change in image is generated by the amount equal to or greater than the determined amount falls within a darkness range.

7. The information processing apparatus according to claim 6, wherein the circuitry is configured to determine whether to fall within the darkness range based on an image transmissivity for a brightest gradation level among gradation levels at all viewpoints in the image region in which the change in image is generated by the amount equal to or greater than the determined amount being 0.6 or less.

8. The information processing apparatus according to claim 6, wherein the circuitry is further configured to perform gradation correction on the plurality of input images before the first output image and the second output image are generated in response to the gradation level not falling within the darkness range.

9. The information processing apparatus according to claim 1, wherein the transmissive transfer medium is a transparent medium or a semitransparent medium having two flat transfer surfaces.

10. The information processing apparatus according to claim 1, wherein the at least one transmissive transfer medium is a transmissive transfer medium subjected to the duplex printing, or a laminate of a plurality of transfer media including at least one transmissive transfer medium subjected to the duplex printing.

11. A printing system comprising:
the information processing apparatus according to claim 1; and
a printer configured to perform the duplex printing of the first output image and the second output image on the at least one transmissive transfer medium.

12. An information processing apparatus comprising:
circuitry configured to:
receive a plurality of input images corresponding to respective viewpoints;
generate, based on the plurality of input images, a first output image and a second output image, such that at least part of one of the input images corresponding to each of the viewpoints is reproduced when the first output image and the second output image are printed by duplex printing on at least one transmissive transfer medium having a plurality of image layers on both sides thereof, by
generating a pair of images, based on the plurality of input images, such that a difference between a reproduced image reproducing each of the viewpoints by the plurality of image layers apart from each other and an input image corresponding to each of the viewpoints is minimized, and
performing image inversion on one of the pair of images in accordance with an opening direction of the duplex printing; and
instruct a printer to print the first output image and the second output image by duplex printing.

13. A printing system comprising:
the information processing apparatus according to claim 12; and
the printer configured to perform the duplex printing of the first output image and the second output image on the at least one transmissive transfer medium.

14. The information processing apparatus according to claim 12, wherein the transmissive transfer medium is a transparent medium or a semitransparent medium having two plat transfer surfaces.

15. The information processing apparatus according to claim 12, wherein the at least one transmissive transfer medium is a transmissive transfer medium subjected to the duplex printing, or a laminate of a plurality of transfer media including at least one transmissive transfer medium subjected to the duplex printing.

16. An information processing apparatus comprising:
circuitry configured to:
receive a plurality of input images corresponding to respective viewpoints;
generate, based on the plurality of input images, a first output image and a second output image such that at least part of one of the input images corresponding to each of the viewpoints is reproduced when the first output image and the second output image are printed by duplex printing on at least one transmissive transfer medium having a plurality of image layers on both sides thereof;
optimize the first output image and the second output image based on the plurality of input images to minimize a difference between a reproduced image reproducing each of the viewpoints by the plurality of image layers apart from each other, and an input image corresponding to each of the viewpoints, under a condition that the plurality of image layers are printed by the duplex printing to be opened in a predetermined opening direction; and
instruct a printer to print the first output image and the second output image by duplex printing.

17. The information processing apparatus according to claim 16, wherein the transmissive transfer medium is a transparent medium or a semitransparent medium having two plat transfer surfaces.

18. The information processing apparatus according to claim 16, wherein the at least one transmissive transfer medium is a transmissive transfer medium subjected to the duplex printing, or a laminate of a plurality of transfer media including at least one transmissive transfer medium subjected to the duplex printing.

19. A printing system comprising:
the information processing apparatus according to claim 16; and
the printer configured to perform the duplex printing of the first output image and the second output image on the at least one transmissive transfer medium.

* * * * *